(12) United States Patent
Kudo

(10) Patent No.: US 11,330,136 B2
(45) Date of Patent: May 10, 2022

(54) LIGHT SOURCE DEVICE

(71) Applicant: CANON KABUSHIKI KAISHA, Tokyo (JP)

(72) Inventor: Genichiro Kudo, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 8 days.

(21) Appl. No.: 17/099,741

(22) Filed: Nov. 16, 2020

(65) Prior Publication Data
US 2021/0152705 A1 May 20, 2021

(30) Foreign Application Priority Data

Nov. 19, 2019 (JP) .............................. JP2019-208877

(51) Int. Cl.
| | | |
|---|---|---|
| *H04N 1/028* | (2006.01) | |
| *G02B 5/30* | (2006.01) | |
| *G03G 15/04* | (2006.01) | |
| *B41J 2/47* | (2006.01) | |
| *G03G 15/043* | (2006.01) | |

(52) U.S. Cl.
CPC .......... *H04N 1/02895* (2013.01); *B41J 2/471* (2013.01); *G02B 5/3066* (2013.01); *G03G 15/04072* (2013.01); *H04N 1/0288* (2013.01); *G03G 15/0435* (2013.01)

(58) Field of Classification Search
CPC ... H04N 1/02895; H04N 1/0288; B41J 2/471; G02B 5/3066; G02B 26/123; G03G 15/04072; G03G 15/0435
See application file for complete search history.

(56) References Cited

U.S. PATENT DOCUMENTS

| | | | |
|---|---|---|---|
| 2005/0185236 A1* | 8/2005 | Kudo | .................. G02B 26/127 |
| | | | 359/205.1 |
| 2011/0043879 A1* | 2/2011 | Inagaki | ................ G02B 26/123 |
| | | | 359/204.1 |

FOREIGN PATENT DOCUMENTS

| | | |
|---|---|---|
| JP | H10253904 A | 9/1998 |
| JP | 2003182149 A | 7/2003 |
| JP | 2007293016 A | 11/2007 |

\* cited by examiner

*Primary Examiner* — Susan S Lee
(74) *Attorney, Agent, or Firm* — Rossi, Kimms & McDowell LLP

(57) ABSTRACT

Provided is a light source device including a plurality of light emitting points arranged in matrix within a first cross section parallel to a first direction and a second direction. When light emitting points are projected within a second cross section parallel to first direction and a third direction perpendicular to first cross section, light emitting points have equal intervals between projections adjacent to each other. When light emitting points are projected within a third cross section parallel to second and third directions, light emitting points have equal intervals between projections adjacent to each other. An interval between light emitting points adjacent to each other in a row of matrix, an interval between light emitting points adjacent to each other in a column of matrix, an angle between row and column, an angle between column and first direction, and an angle between row and second direction are appropriately set.

16 Claims, 13 Drawing Sheets

LIGHT SOURCE DEVICE

BACKGROUND OF THE INVENTION

Field of the Invention

The present invention relates to a light source device.

Description of the Related Art

Hitherto, there has been a demand for an image forming apparatus capable of forming an image at high speed.

In Japanese Patent Application Laid-Open No. 2003-182149, there is disclosed an image forming apparatus capable of forming an image at high speed as follows. That is, a light scanning apparatus including a light source device in which a plurality of light emitting points are two-dimensionally arrayed is used to cause a plurality of light fluxes to be incident on a scanned surface through one scanning.

When such a light source device in which a plurality of light emitting points are two-dimensionally arrayed as disclosed in Japanese Patent Application Laid-Open No. 2003-182149 is used in the light scanning apparatus, in order to achieve a desired resolution, an optical magnification of an imaging optical system is uniquely determined based on intervals of the plurality of light fluxes emitted from the light source device.

Thus, in the conventional light scanning apparatus using such a light source device, it has been required to design a dedicated optical system depending on the configuration of the light source device.

SUMMARY OF THE INVENTION

In view of the above, the present invention has an object to provide a light source device for a light scanning apparatus, which is capable of forming an image at high speed so as to correspond to a plurality of resolutions without changing an optical system.

According to the present invention, there is provided a light source device including a plurality of light emitting points arranged in matrix within a first cross section parallel to a first direction and a second direction, wherein, when the plurality of light emitting points are projected within a second cross section parallel to the first direction and a third direction perpendicular to the first cross section, the plurality of light emitting points have equal intervals between projections adjacent to each other, wherein, when the plurality of light emitting points are projected within a third cross section parallel to the second direction and the third direction, the plurality of light emitting points have equal intervals between projections adjacent to each other, and wherein the following condition is satisfied:

$$0.4 < (P_s \times \cos(\alpha+\beta))/(P_m \times \cos(\alpha+\gamma)) < 0.6,$$

where $P_m$ represents an interval between light emitting points adjacent to each other in a row of the matrix, $P_s$ represents an interval between light emitting points adjacent to each other in a column of the matrix, $\alpha$ represents an angle formed between the row and the column, $\gamma$ represents an angle formed between the column and the first direction, and $\beta$ represents an angle formed between the row and the second direction.

Further features of the present invention will become apparent from the following description of exemplary embodiments with reference to the attached drawings.

DESCRIPTION OF THE EMBODIMENTS

A light source device according to each embodiment of the present invention is described in detail below with reference to the accompanying drawings. Some of the drawings referred to below may be drawn in scales different from the actual scale for easier understanding of the embodiments of the present invention.

In the following description, a main scanning direction refers to a direction perpendicular to a rotational axis of a deflecting unit and an optical axis of an optical system (direction in which a light flux is deflected and scanned by a rotating polygon mirror). A sub-scanning direction refers to a direction parallel to the rotational axis of the deflecting unit. A main scanning cross section refers to a cross section perpendicular to the sub-scanning direction. A sub-scanning cross section refers to a cross section perpendicular to the main scanning direction.

Thus, it should be noted that, in the following description, the main scanning direction and the sub-scanning cross section vary between an incident optical system and an imaging optical system.

First Embodiment

Figure 1A:
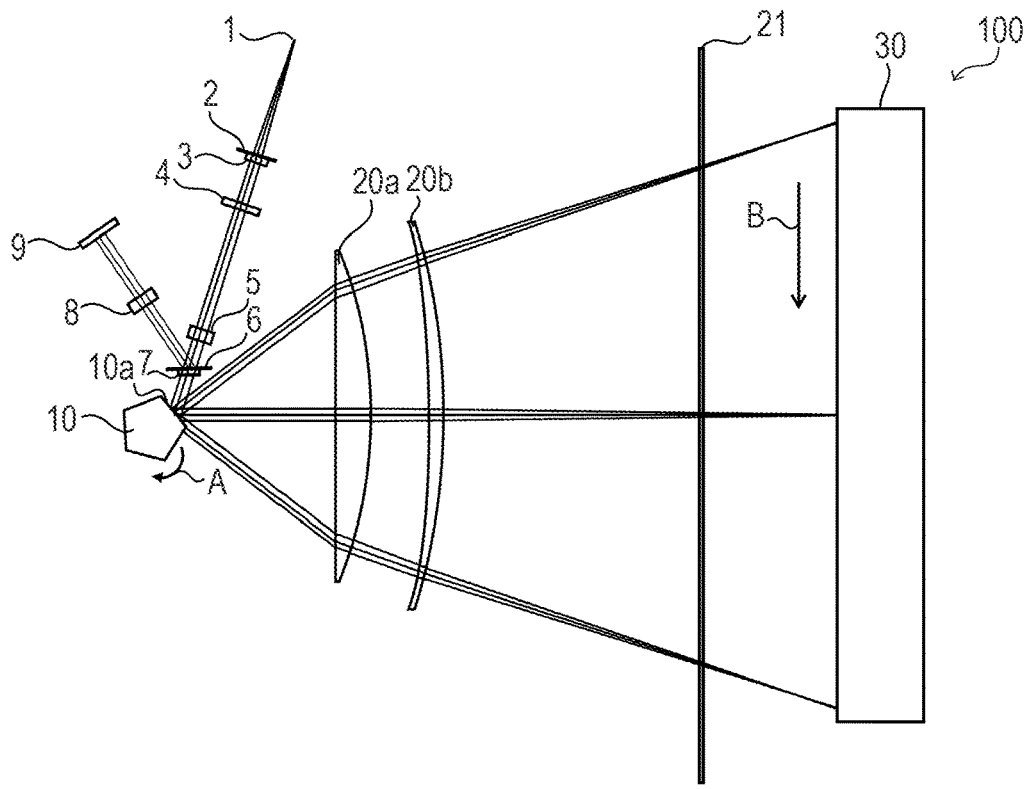
FIG. 1A is a schematic main scanning cross-sectional view of a light scanning apparatus including a light source device according to a first embodiment.
Figure 1B:
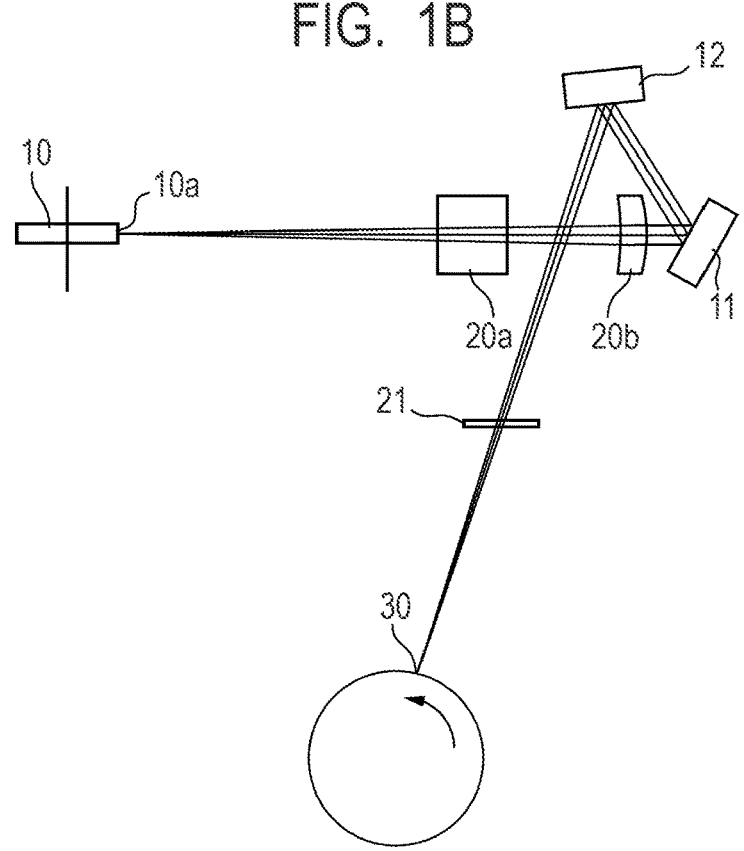
FIG. 1B is a partially-enlarged schematic sub-scanning cross-sectional view of the light scanning apparatus including the light source device according to the first embodiment.

FIG. 1A and FIG. 1B are a schematic main scanning cross-sectional view and a partially-enlarged schematic sub-scanning cross-sectional view, respectively, of a light scanning apparatus 100 including a light source device 1 according to a first embodiment.

As illustrated in FIG. 1A, the light scanning apparatus 100 includes the light source device 1 according to the first embodiment, a sub-scanning stop 2, a collimator lens 3, a spherical lens 4, a cylindrical lens 5, a main scanning stop 6, and a wedge prism 7.

Further, the light scanning apparatus 100 includes an APC imaging lens 8, an APC sensor 9, a deflecting unit 10, and folding mirrors 11 and 12 (reflecting members).

Further, the light scanning apparatus 100 includes a first fθ lens (first imaging lens) 20a, a second fθ lens (second imaging lens) 20b, and a dust-proof glass 21.

In this case, the sub-scanning stop 2, the collimator lens 3, the spherical lens 4, the cylindrical lens 5, the main scanning stop 6, and the wedge prism 7 form an incident optical system 65 of the light scanning apparatus 100.

Further, the APC imaging lens 8 forms an APC optical system 70 of the light scanning apparatus 100.

Further, the folding mirrors 11 and 12 form a reflecting optical system 80 of the light scanning apparatus 100.

Further, the first fθ lens 20a and the second fθ lens 20b form an imaging optical system 90 of the light scanning apparatus 100.

The light source device 1 according to the first embodiment is a multi-beam light source being a semiconductor laser including a plurality of light emitting points (light emitting units).

Further, a distance from an optical axis of the incident optical system 65 of at least one light emitting point among the plurality of light emitting points included in the light source device 1 is different from a distance from the optical axis of the incident optical system 65 of at least one different light emitting point.

Further, the light source device 1 according to the first embodiment is formed of a surface emitting laser in which thirty-two light emitting points are two-dimensionally arrayed as described in detail later.

When such a thirty-two-beam laser is used, the speed and definition of the scanning performed by the light scanning apparatus 100 can be increased.

The sub-scanning stop 2 is configured to restrict a light flux width in the sub-scanning direction of light fluxes emitted from the light source device 1 to adjust the beam shape.

Further, in the light scanning apparatus 100, the sub-scanning stop 2 is arranged in the vicinity of the collimator lens 3, and an exit pupil position in the sub-scanning direction of the sub-scanning stop 2 is set in the vicinity of the second fθ lens 20b.

In this manner, principal rays of the thirty-two beams can pass the same position in the sub-scanning direction in the vicinity of the second fθ lens 20b.

The collimator lens 3 is a condensing lens made of glass, and is formed of a so-called cemented lens obtained by cementing together a convex lens and a concave lens.

Further, the spherical lens 4 is a convex spherical lens made of glass, and is a lens configured to adjust a spot diameter on a scanned surface 30.

Further, the collimator lens 3 and the spherical lens 4 are configured to reduce a difference in spot diameter among the plurality of light emitting points, and to convert divergent light fluxes that have passed through the sub-scanning stop 2 into parallel light fluxes. In this case, the parallel light fluxes include not only strictly parallel light fluxes but also substantially parallel light fluxes such as weakly divergent light fluxes and weakly convergent light fluxes.

That is, the weakly divergent light fluxes exiting from the collimator lens 3 are converted into parallel light fluxes by the spherical lens 4. Thus, light condensing positions (focus positions) of the light fluxes emitted from the plurality of light emitting points of the light source device 1 can be made be substantially the same at the scanned surface 30, that is, at a deflecting surface 10a of the deflecting unit 10.

In this manner, the spot diameters of the plurality of light fluxes on the scanned surface 30 can be substantially the same.

The cylindrical lens 5 has a power only within the sub-scanning cross section, and is configured to condense the light fluxes that have passed through the collimator lens 3 and the spherical lens 4 only within the sub-scanning cross section.

The main scanning stop 6 is configured to restrict a light flux width in the main scanning direction of the light fluxes that have passed through the cylindrical lens 5 to adjust the beam shape.

In the light scanning apparatus 100, the main scanning stop 6 is arranged on the deflecting unit 10 side of the collimator lens 3.

Further, the main scanning stop 6 arranged in the vicinity of the deflecting unit 10 is configured to restrict the light flux width in the main scanning direction, and is capable of bringing the principal rays of the light fluxes emitted from the light emitting points of the light source device 1 close to each other on the deflecting surface 10a of the deflecting unit 10.

Thus, the light scanning apparatus 100 can reduce vertical line fluctuations to be caused in the case of using multiple beams.

The wedge prism 7 is a prism having a wedge shape in the main scanning direction, and is arranged so that its incident surface and the main scanning stop 6 match each other.

The wedge prism 7 is provided so that the incident surface and an exit surface thereof form an angle of 4° within the main scanning cross section.

This is for the purpose of preventing light reflected from the exit surface of the wedge prism 7 from entering the APC sensor 9.

The APC imaging lens 8 is configured to condense the light fluxes reflected by the incident surface of the wedge prism 7 on the APC sensor 9.

The APC sensor 9 is an automatic power control (APC) sensor for use to cause each of the plurality of light emitting points of the light source device 1 to emit a beam at a desired light amount.

The light source device 1 according to the first embodiment adopts a surface emitting-type laser, that is, a vertical cavity surface emitting laser (VCSEL) as described later, and hence, unlike an edge emitting-type laser, the APC sensor cannot be arranged in the device.

Thus, in the light scanning apparatus 100, the APC sensor 9 is provided outside of the light source device 1.

As described above, the light fluxes emitted from the light source device 1 are condensed only in the sub-scanning direction in the vicinity of the deflecting surface 10a of the deflecting unit 10, to thereby be imaged as a line image that is long in the main scanning direction.

In the light scanning apparatus 100, the collimator lens 3 and the cylindrical lens 5 may be integrally formed as one optical element.

The deflecting unit 10 is a light deflecting unit serving as a deflecting means, and is formed of a polygon mirror (rotating polygon mirror) having a five-surface configuration. Further, the deflecting unit 10 is rotated by a motor or other driving unit (not shown) at a constant speed in a direction of the arrow A of FIG. 1A.

The first and second fθ lenses 20a and 20b correspond to the imaging optical system having a light condensing function and an fθ characteristic.

Further, the first fθ lens 20a is formed of a plano-convex spherical lens made of glass, and the second fθ lens 20b is formed of an anamorphic lens having an aspherical shape within the main scanning cross section.

The first and second fθ lenses 20a and 20b are configured to condense (guide) the light fluxes which are based on image information and reflected and deflected by the deflecting unit 10 onto the scanned surface 30.

Further, the first and second fθ lenses 20a and 20b are configured to perform facet angle error correction by bringing the deflecting surface 10a of the deflecting unit 10 and the scanned surface 30 into a conjugate relationship within the sub-scanning cross section.

Further, in the light scanning apparatus 100, paraxial field curvatures are appropriately caused within the sub-scanning cross sections of the first and second fθ lenses 20a and 20b.

In this manner, when the facet angle error occurs, positional displacement of the spots in the sub-scanning direction on the scanned surface 30 can be reduced, that is, pitch unevenness can be reduced.

The folding mirrors 11 and 12 are arranged to fold the light fluxes that have passed through the first and second fθ lenses 20a and 20b toward the scanned surface 30.

Further, in the light scanning apparatus 100, the folding mirrors 11 and 12 are arranged at the subsequent stage of the first and second fθ lenses 20a and 20b.

This configuration suppresses reduction in optical performance to be caused in the folding mirror when a light flux is incident on a shifted position of the incident surface of the fθ lens due to reflection at a shifted angle.

As described above, in the light scanning apparatus 100, the thirty-two light fluxes emitted from the light source device 1 while being optically modulated based on the image information are restricted in light flux width in the sub-scanning direction by the sub-scanning stop 2.

Then, the light fluxes that have passed through the sub-scanning stop 2 are converted by the collimator lens 3 and the spherical lens 4 into parallel light fluxes, and are condensed by the cylindrical lens 5 only within the sub-scanning cross section.

Then, the light fluxes that have passed through the cylindrical lens 5 are restricted in light flux width in the main scanning direction by the main scanning stop 6, and are imaged in the vicinity of the deflecting surface 10a of the deflecting unit 10 as a line image that is long in the main scanning direction.

Then, the plurality of light fluxes reflected and deflected by the deflecting surface 10a of the deflecting unit 10 are condensed by the first and second fθ lenses 20a and 20b having a convex power mainly within the main scanning cross section, to thereby be imaged into a spot shape on the scanned surface 30.

Then, the deflecting unit 10 is rotated in the direction of the arrow A so that the scanned surface 30 is light-scanned at a constant speed in a direction of the arrow B (main scanning direction).

Further, as the scanned surface 30, a photosensitive drum 30 is used. Further, a light exposure distribution in the sub-scanning direction on the photosensitive drum 30 is created by rotating the photosensitive drum 30 in the sub-scanning direction for each main scanning light exposure.

In this manner, the light scanning apparatus 100 is configured to simultaneously form a plurality of scanning lines on a photosensitive surface of the photosensitive drum 30 serving as a recording medium, to thereby perform image recording.

Next, features of the light source device 1 according to the first embodiment are described.

Figure 2A:
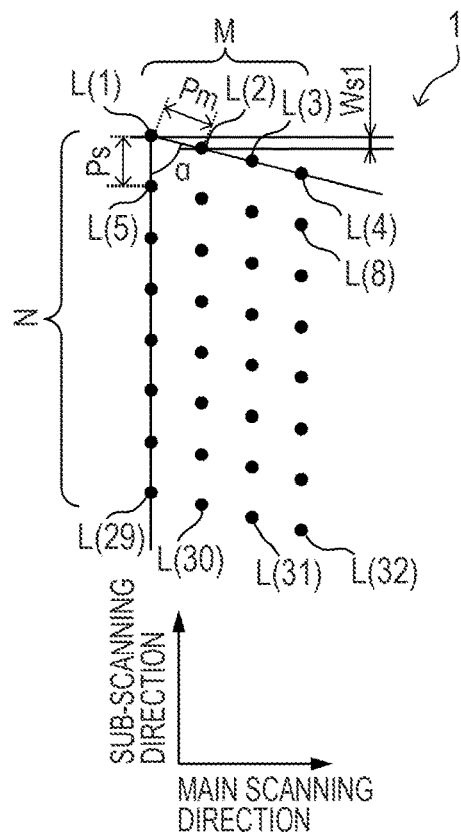
FIG. 2A is a view for illustrating a light emitting point array in a first arrangement of the light source device according to the first embodiment.
Figure 2B:
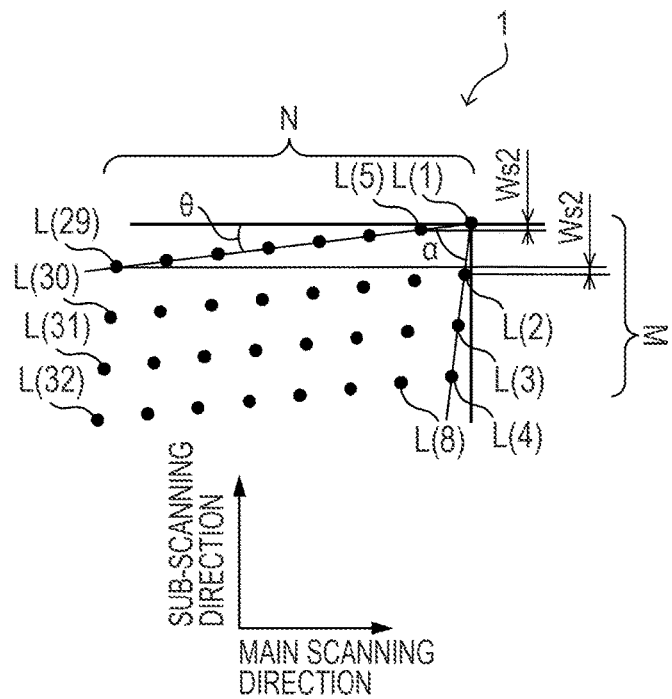
FIG. 2B is a view for illustrating a light emitting point array in a second arrangement of the light source device according to the first embodiment.

FIG. 2A and FIG. 2B are illustrations of light emitting point arrays in a first arrangement and a second arrangement, respectively, of the light source device 1 according to the first embodiment.

In this case, the first arrangement refers to an arrangement to be used for the light scanning apparatus 100 having a resolution $R_1$ in the sub-scanning direction on the scanned surface 30 of $R_1$=2,400 dots per inch (dpi).

Further, the second arrangement refers to an arrangement to be used for the light scanning apparatus 100 having a resolution $R_2$ in the sub-scanning direction on the scanned surface 30 of $R_2$=4,800 dpi. The second arrangement is an arrangement rotated clockwise by φ=90°−θ from the first arrangement within a first cross section parallel to the main scanning direction and the sub-scanning direction.

The light source device 1 according to the first embodiment is not limited to the above-mentioned resolutions, and can be configured to adapt to other resolutions.

The light source device 1 according to the first embodiment is formed of a surface emitting laser (VCSEL) in which thirty-two light emitting points are two-dimensionally arrayed (arranged in matrix) within the first cross section.

Further, as illustrated in FIG. 2A, in the first arrangement, the thirty-two light emitting points are arrayed in a parallelogram shape having four columns and eight rows (M=4× N=8).

That is, in the light source device 1 according to the first embodiment, when adjacent two sides of the parallelogram are defined as a row and a column, the thirty-two light emitting points are arranged in matrix.

Further, in the first arrangement, the column direction and the sub-scanning direction are parallel to each other. That is, in the first arrangement, the number of light emitting points in a column (N=8) is larger than the number of light emitting points in a row (M=4).

In this case, as illustrated in FIG. 2A, the thirty-two light emitting points are labeled from L(1) to L(32).

In the light source device 1 according to the first embodiment, an interval Ps between light emitting points adjacent to each other among the eight light emitting points in the column direction in the first arrangement (that is, for example, an interval between L(1) and L(5) in the column direction) is set to 0.042 mm.

Further, an interval Pm between light emitting points adjacent to each other among the four light emitting points in the row direction in the first arrangement (that is, for example, an interval between L(1) and L(2) in the row direction) is set to 0.040 mm.

In the light source device 1 according to the first embodiment, in order to facilitate arranging of wiring patterns in laser chip manufacture and to improve heat radiation performance, the interval Ps and the interval Pm are set to 0.042 mm and 0.040 mm, respectively.

Further, in the light source device 1 according to the first embodiment, an angle (acute angle) "α" formed between the column direction and the row direction within the first cross section parallel to the main scanning direction and the sub-scanning direction is set to 74.78°.

The value of the angle "α" is determined based on a relational expression of cos α=Ps/(M×Pm). This relational expression can be derived from a condition for satisfying that, when the thirty-two light emitting points are projected within a sub-scanning cross section parallel to the sub-scanning direction and the optical axis direction perpendicular to the first cross section, the light emitting points have equal intervals Ws1 between light emitting points (projections, projected points, or projected images) adjacent to each other.

That is, this relational expression is a conditional expression for obtaining uniform intervals between scanning lines formed on the scanned surface 30 by the beams emitted from the thirty-two light emitting points.

This configuration can suppress image deterioration such as moire or pitch unevenness to be caused when the scanning line intervals are non-uniform.

Further, from the relational expression of Ws1=Ps/M shown in FIG. 2A, the interval Ws1 is obtained as 0.0105 mm.

As described above, the second arrangement illustrated in FIG. 2B of the light source device 1 according to the first embodiment is an arrangement rotated clockwise by φ=90°−θ from the first arrangement illustrated in FIG. 2A within the first cross section parallel to the main scanning direction and the sub-scanning direction.

In this case, for the convenience of description, the column direction defined by the eight light emitting points and the row direction defined by the four light emitting points in the first arrangement are referred to as a row direction defined by eight light emitting points and a column direction defined by four light emitting points in the second arrangement.

That is, as illustrated in FIG. 2B, in the second arrangement, the thirty-two light emitting points L(1) to L(32) are arrayed in a parallelogram shape having eight columns and four rows (N=8×M=4).

Further, within the first cross section parallel to the main scanning direction and the sub-scanning direction, the row direction defined by the eight light emitting points and the main scanning direction form an angle of "θ" (acute angle).

At this time, when the thirty-two light emitting points are projected within the sub-scanning cross section parallel to the sub-scanning direction and the optical axis direction perpendicular to the first cross section in the second arrangement, in order that the light emitting points have equal intervals Ws2 between light emitting points adjacent to each other, it is required to satisfy the following expression (1).

$$N = Ps \times \sin\theta = Pm \times \cos\{90° - (\alpha + \theta)\} \quad (1)$$

It is understood from the expression (1) that the angle "θ" is required to satisfy the following expression (2).

$$\tan\theta = \frac{\sin\alpha}{\frac{N \times Ps}{Pm} - \cos\alpha} \quad (2)$$

Then, from the expression (2), the angle "θ" can be obtained as θ=6.76°.

That is, when the light source device 1 according to the first embodiment is changed from the first arrangement to the second arrangement, the light source device 1 is rotated clockwise by 90°−θ=83.24° within the first cross section parallel to the main scanning direction and the sub-scanning direction.

Further, from the relational expression of Ws2=Ps×sin θ, the interval Ws2 can be obtained as Ws2=0.005 mm.

Further, when an absolute value of a sub-scanning lateral magnification of the entire optical system of the light scanning apparatus 100 on which the light source device 1 according to the first embodiment is mounted in the first arrangement is represented by $|\beta_{s1}|$, in order to achieve the resolution of $R_1=2,400$ dpi, from the following expression (3):

$$Ws1=25.4/(R_1\times|\beta_{s1}|) \quad (3),$$

the absolute value $|\beta_{s1}|$ may be set as $|\beta_{s1}|=25.4/(2,400\times 0.0105)=1.01$.

Similarly, when an absolute value of a sub-scanning lateral magnification of the entire optical system of the light scanning apparatus 100 on which the light source device 1 according to the first embodiment is mounted in the second arrangement is represented by $|\beta_{s2}|$, in order to achieve the resolution of $R_2=4,800$ dpi, from the following expression (4):

$$Ws2=25.4/(R_2\times|\beta_{s2}|) \quad (4),$$

the absolute value $|\beta_{s2}|$ may be set as $|\beta_{s2}|=25.4/(4,800\times 0.005)=1.07$.

As described above, the light source device 1 according to the first embodiment may be rotated from the first arrangement to the second arrangement so that the resolution can be increased from $R_1=2,400$ dpi to $R_2=4,800$ dpi.

Figure 3:
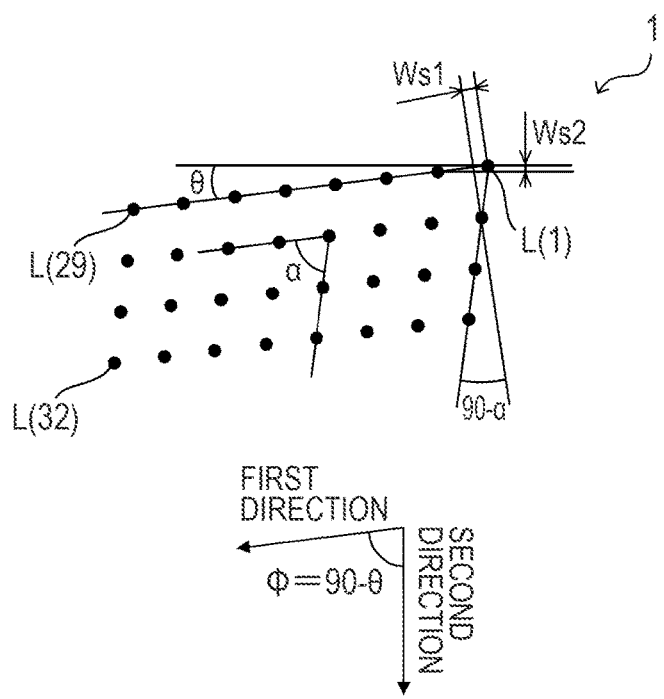
FIG. 3 is a view for illustrating a relationship between angles in the light source device according to the first embodiment.

Further, FIG. 3 is an illustration of a relationship between the angles "α" and "θ" described above.

In this case, a first direction and a second direction are defined as illustrated in FIG. 3, and it is assumed that, when the thirty-two light emitting points are projected within a second cross section parallel to the first direction and a third direction perpendicular to the first cross section, all of the light emitting points have equal intervals Ws1 between light emitting points adjacent to each other.

Further, it is assumed that, when the thirty-two light emitting points are projected within a third cross section parallel to the second direction and the third direction perpendicular to the first cross section, all of the light emitting points have equal intervals Ws2 between light emitting points adjacent to each other.

At this time, an angle "φ" formed between the first direction and the second direction is $\varphi=90°-\theta=83.24°$.

As described above, in the light source device 1 according to the first embodiment, the interval Ws1 between adjacent light emitting points obtained when the light emitting points are projected within the second cross section and the interval Ws2 between adjacent light emitting points obtained when the light emitting points are projected within the third cross section satisfy a relationship of Ws2/Ws1=0.47.

That is, the light source device 1 according to the first embodiment satisfies the following conditional expression (5).

$$0.4<Ws2/Ws1<0.6 \quad (5)$$

When the conditional expression (5) is satisfied, two light scanning apparatus having resolutions different from each other by about two times can be designed only by rotating the light source device 1 according to the first embodiment without changing the optical system.

The light source device 1 according to the first embodiment is preferred to satisfy the following conditional expression (5a).

$$0.42<Ws2/Ws1<0.58 \quad (5a)$$

Further, the light source device 1 according to the first embodiment is more preferred to satisfy the following conditional expression (5b).

$$0.45<Ws2/Ws1<0.55 \quad (5b)$$

Next, design parameters of the light scanning apparatus 100 including the light source device 1 according to the first embodiment are shown in Table 1 and Table 2 below.

TABLE 1

| | | |
|---|---|---|
| Usage wavelength (mm) | | 6.80E−07 |
| Refractive index of imaging unit 20a (λ = 680 nm) | | 1.79 |
| Refractive index of imaging unit 20b (λ = 680 nm) | | 1.53 |
| Number of surfaces of deflecting unit | | 5 |
| Circumradius of deflecting unit (mm) | | 17 |
| Rotation angle of deflecting unit (±deg.) | | 21.5 |
| Incident angle in main scanning direction (deg.) | | 70 |
| Incident angle in sub-scanning direction (deg.) | | 0 |
| Axial deflection point to incident surface of first imaging lens (mm) | | 8.51E+01 |
| Focal length of imaging lens (mm) | | 2.50E+02 |
| Best spot diameter on scanned surface (main × sub μm) | | 40 × 40 |

| Rotation center coordinate of deflecting unit | | |
|---|---|---|
| X | | −12.04 |
| Y | | −6.78 |

| Incident optical system | | | |
|---|---|---|---|
| | r | d | N (680 nm) |
| Light source (light emitting point) | 0 | 66.01 | 1.0000 |
| Sub-scanning stop | | 0.9190 | 1.000 |
| Collimator lens | 491.9841 | 1.5000 | 1.7736 |
| | 42.7415 | 2.0000 | 1.6919 |
| | −59.5707 | 25.0000 | |
| Spherical lens | ∞ | 4.0000 | 1.5131 |
| | −171.9690 | 69.0930 | 1.0000 |
| Cylindrical lens* | 24.1000 | 7.0000 | 1.5131 |
| | ∞ | 15.9720 | 1.0000 |
| Main scanning stop | | 0.0000 | |
| Wedge prism | ∞ | 2.3804 | 1.5131 |
| | ∞ | 25.0500 | 1.0000 |
| Deflecting surface | ∞ | 0.0000 | 1.0000 |

TABLE 1-continued

|  | R1 surface | | | | R2 surface | | | |
|---|---|---|---|---|---|---|---|---|
|  | Scanning start side (s) | | Scanning end side (e) | | Scanning start side (s) | | Scanning end side (e) | |
| Main scanning | d | | 2.50E+01 | | d | | 3.830E+01 | |
| Sub-scanning | R | | ∞ | | R | | −2.24E+02 | |
|  | r | | ∞ | | r | | −2.24E+02 | |

|  | R3 surface | | | | R4 surface | | | |
|---|---|---|---|---|---|---|---|---|
|  | Scanning start side (s) | | Scanning end side (e) | | Scanning start side (s) | | Scanning end side (e) | |
| Main scanning cross section | d | | 8.00E+00 | | d | | 2.12E+02 | |
|  | R | | 7.64E+03 | | R | | −1.11E+03 | |
|  | K | 1.29E+01 | K | 1.29E+01 | K | −4.24E+01 | K | −4.24E+01 |
|  | B4 | −1.31E−07 | B4 | −1.31E−07 | B4 | −1.19E−07 | B4 | −1.19E−07 |
|  | B6 | 3.12E−12 | B6 | 3.12E−12 | B6 | 1.44E−12 | B6 | 1.44E−12 |
|  | B8 | 4.04E−16 | B8 | 4.04E−16 | B8 | 5.14E−16 | B8 | 5.14E−16 |
|  | B10 | −2.04E−20 | B10 | −2.04E−20 | B10 | −2.24E−20 | B10 | −2.24E−20 |
| Sub-scanning cross section | r | | −5.41E+01 | | r | | −2.85E+01 | |
|  | D2 | 9.48E−05 | D2 | 9.48E−05 | D2 | 4.84E−05 | D2 | 4.84E−05 |
|  | D4 | −2.40E−09 | D4 | −2.40E−09 | D4 | −3.10E−09 | D4 | −3.10E−09 |
|  | D6 | 0.00E+00 | D6 | 0.00E+00 | D6 | 1.28E−13 | D6 | 1.28E−13 |
|  | D8 | 0.00E+00 | D8 | 0.00E+00 | D8 | 3.58E−18 | D8 | 3.58E−18 |
|  | D10 | 0.00E+00 | D10 | 0.00E+00 | D10 | −3.69E−22 | D10 | −3.69E−22 |
|  | M0 | | 0.00E+00 | | M0 | | 0.00E+00 | |
|  | M1 | | 0.00E+00 | | M1 | | 0.00E+00 | |
|  | M2 | | 0.00E+00 | | M2 | | 0.00E+00 | |
|  | M3 | | 0.00E+00 | | M3 | | 0.00E+00 | |
|  | M4 | | 0.00E+00 | | M4 | | 0.00E+00 | |

*( ) refers to sub-scanning direction

TABLE 2

|  | X coordinate | Z coordinate | Surface normal angle |
|---|---|---|---|
| Deflection point | 0 | 0 | |
| Folding mirror 11 | 160.98 | 0 | 57° |
| Folding mirror 12 | 137.67 | 35.94 | −70.5° |
| Distance from deflection point to scanned surface 30 [mm] | | | 368.5 |

In Table 1 and Table 2, when an intersection between each lens surface and an optical axis of each lens is set as an origin, an optical axis direction, an axis orthogonal to the optical axis within the main scanning cross section, and an axis orthogonal to the optical axis within the sub-scanning cross section are set as an X axis, a Y axis, and a Z axis, respectively. Further, "E-x" means "×10$^{-x}$."

Further, an aspherical shape (meridional line shape) within the main scanning cross section of each lens surface of the second fθ lens 20b of the light scanning apparatus 100 is expressed by the following expression (6).

$$X = \frac{\frac{Y^2}{R}}{1+\sqrt{1-(1+K)\left(\frac{Y}{R}\right)^2}} + B_4 Y^4 + B_6 Y^6 + B_8 Y^8 + B_{10} Y^{10} \quad (6)$$

In this case, R represents a curvature radius, K represents an eccentricity, and Bi (i=4, 6, 8, 10) represents an aspherical coefficient.

In the light scanning apparatus 100, each of the first and second fθ lenses 20a and 20b has a shape in the main scanning direction which is symmetric with respect to the optical axis, that is, the aspherical coefficients are identical to each other between the scanning start side and the scanning end side.

Further, the second fθ lens 20b has an incident surface and an exit surface which are both formed into an arc shape within the sub-scanning cross section, and an aspherical shape (sagittal line shape) within the sub-scanning cross section of each lens surface is expressed by the following expression (7).

$$S = \frac{\frac{Z^2}{r'}}{1+\sqrt{1-\left(\frac{Z}{r'}\right)^2}} + \sum_{i=0}^{4} M_i Y^i Z^4 \quad (7)$$

In this case, Mi (i=0, 1, 2, 3, 4) represents an aspherical coefficient. Further, in the shape within the sub-scanning cross section of the second fθ lens 20b, a curvature 1/r of the incident surface within the sub-scanning cross section including the optical axis is expressed by a function of Y on the scanning start side and the scanning end side with respect to the optical axis.

That is, a curvature radius "r" within the sub-scanning cross section is successively changed as in the following expression (8) in an effective part of the lens.

$$r' = r(1 + D_2 Y^2 + D_4 Y^4 + D_6 Y^6 + D_8 Y^8 + D_{10} Y^{10}) \quad (8)$$

In this case, "r" represents a curvature radius on the optical axis, and Di (i=2, 4, 6, 8, 10) represents a change coefficient. Further, the curvature radius within the sub-scanning cross section refers to a curvature radius within a cross section orthogonal to the shape in the main scanning direction (meridional line).

Next, effects of polarization directions in the light source device 1 according to the first embodiment with respect to the light scanning apparatus 100 are described.

Figure 4A:
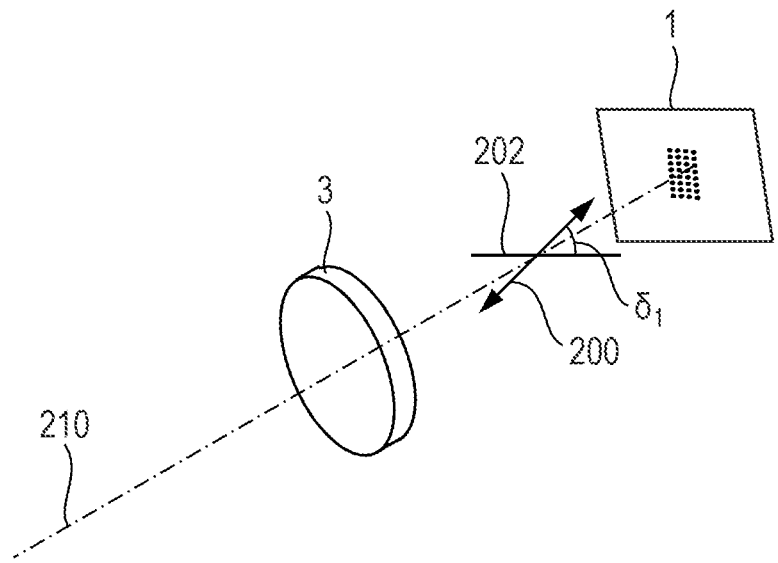
FIG. 4A is a schematic view for illustrating a polarization direction in the first arrangement of the light scanning apparatus including the light source device according to the first embodiment.
Figure 4B:
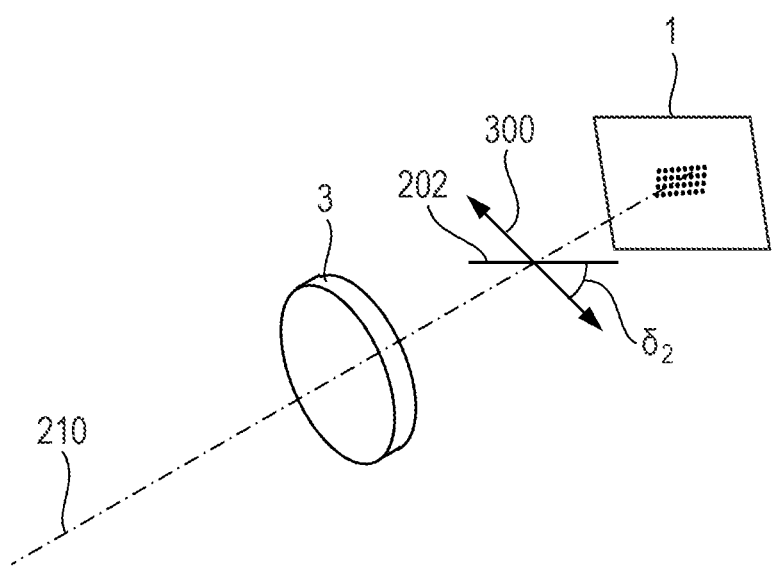
FIG. 4B is a schematic view for illustrating a polarization direction in the second arrangement of the light scanning apparatus including the light source device according to the first embodiment.

FIG. 4A and FIG. 4B are schematic views for illustrating polarization directions in the first arrangement and the second arrangement, respectively, of the light source device 1 according to the first embodiment.

In FIG. 4A and FIG. 4B, an optical axis 210 of the collimator lens 3 and a main scanning cross section 202 perpendicular to the rotational axis of the deflecting unit 10 are schematically illustrated.

As illustrated in FIG. 4A, a polarization direction of a light flux emitted from each of the light emitting points in the first arrangement corresponding to $R_1=2,400$ dpi of the light source device 1 according to the first embodiment corresponds to linear polarization along a linear polarization direction 200.

At this time, a polarization angle $\delta_1$ formed by the linear polarization direction 200 with respect to the main scanning cross section 202 is set to 41.6°.

Further, as illustrated in FIG. 4B, a polarization direction of a light flux emitted from each of the light emitting points in the second arrangement corresponding to $R_2=4,800$ dpi of the light source device 1 according to the first embodiment corresponds to linear polarization along a linear polarization direction 300.

At this time, as described above, when the light source device 1 according to the first embodiment is changed from the first arrangement to the second arrangement, the light source device 1 is rotated clockwise by $\varphi=83.24°$ from the first arrangement within the first cross section parallel to the main scanning direction and the sub-scanning direction.

With this, a polarization angle $\delta_2$ formed by the linear polarization direction 300 with respect to the main scanning cross section 202 is set to −41.6°.

In the light source device 1 according to the first embodiment, as described above, $\delta_1-\delta_2$ corresponds to a rotation angle used when the light source device 1 is changed from the first arrangement to the second arrangement.

At this time, the polarization angles $\delta_1$ and $\delta_2$ are set to $\varphi/2$ and $-\varphi/2$, respectively, with respect to the main scanning cross section. Thus, as described later, a difference in light amount on the scanned surface 30 between the first arrangement and the second arrangement can be reduced.

Figure 5A:
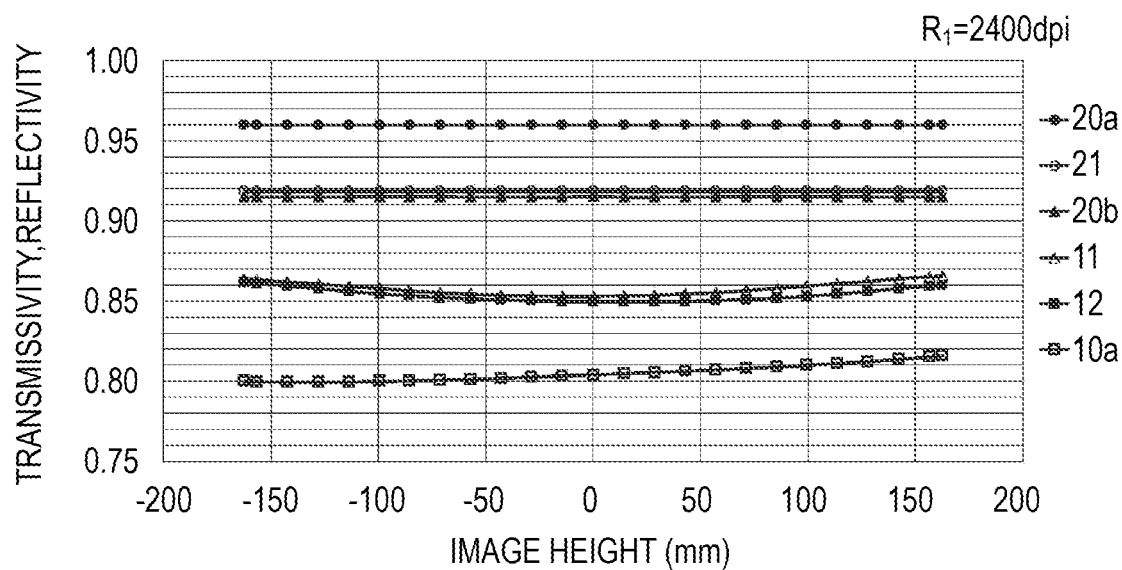
FIG. 5A is a graph for showing an image height dependence of a transmissivity and a reflectivity in the first arrangement of the light scanning apparatus including the light source device according to the first embodiment.

FIG. 5A shows a main scanning direction position dependence of a transmissivity and a reflectivity of optical members of the light scanning apparatus 100 in the first arrangement corresponding to $R_1=2,400$ dpi of the light source device 1 according to the first embodiment.

Specifically, FIG. 5A shows the main scanning direction position dependence of the reflectivity of each of the deflecting surface 10a of the deflecting unit 10 and the folding mirrors 11 and 12, and the main scanning direction position dependence of the transmissivity of each of the first and second fθ lenses 20a and 20b and the dust-proof glass 21.

In FIG. 5A, the horizontal axis represents a main scanning direction arrival position of a scanning light flux on the scanned surface 30, that is, an image height.

Figure 5B:
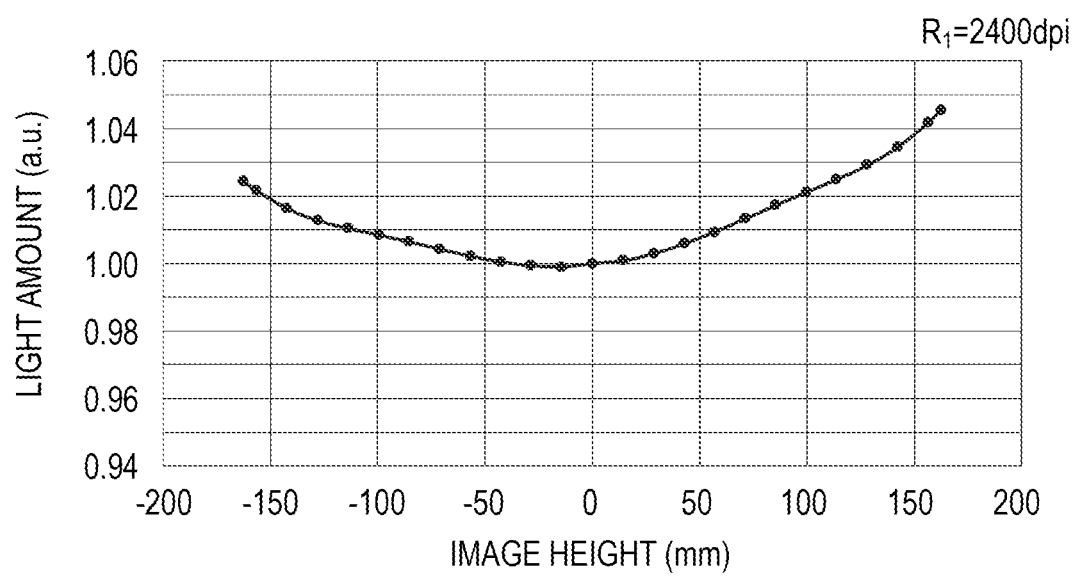
FIG. 5B is a graph for showing an image height dependence of a light amount in the first arrangement of the light scanning apparatus including the light source device according to the first embodiment.

Further, FIG. 5B shows a light amount distribution on the scanned surface 30 generated by the light scanning apparatus 100 in the first arrangement corresponding to $R_1=2,400$ dpi of the light source device 1 according to the first embodiment.

In FIG. 5B, the horizontal axis represents a position in the main scanning direction on the scanned surface 30, that is, an image height, and a light amount at an axial image height is normalized as 1.00.

As shown in FIG. 5B, it is understood that the light amount on the scanned surface 30 is increased from the axial image height toward the most off-axial image height.

Thus, in the light source device 1 according to the first embodiment, in order to obtain a substantially uniform light amount distribution in the main scanning direction on the scanned surface 30, the light emitting amount of the light flux emitted from each light emitting point is changed depending on the position in the main scanning direction of the scanned surface 30.

That is, the light amount unevenness in the main scanning direction of about 5% from peak to peak as shown in FIG. 5B is electrically corrected to reduce the light amount unevenness on the scanned surface 30.

Figure 6A:
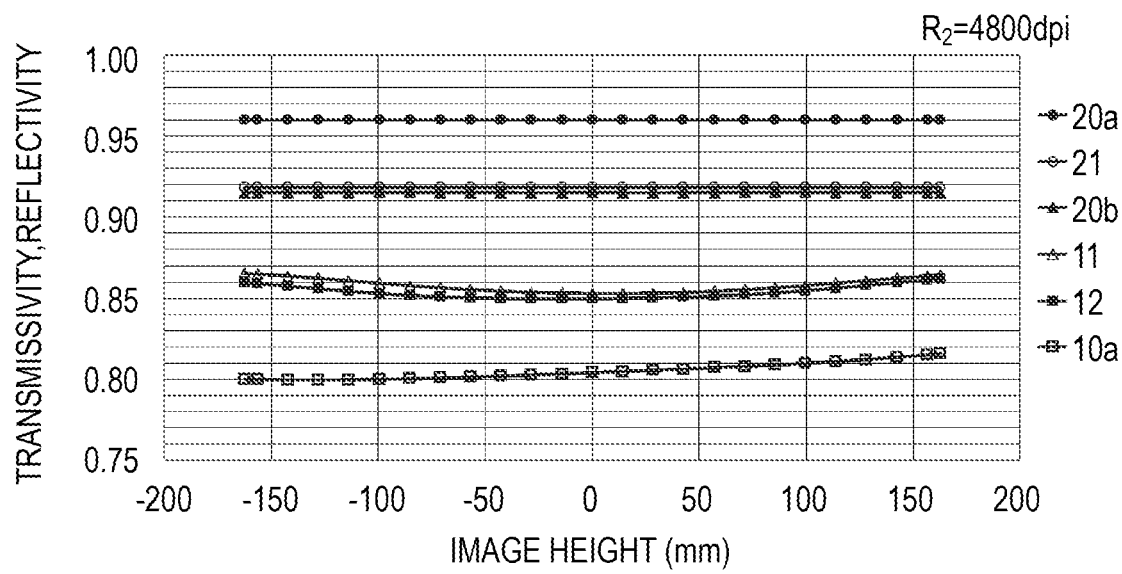
FIG. 6A is a graph for showing an image height dependence of a transmissivity and a reflectivity in the second arrangement of the light scanning apparatus including the light source device according to the first embodiment.

Further, FIG. 6A shows a main scanning direction position dependence of a transmissivity and a reflectivity of optical members of the light scanning apparatus 100 in the second arrangement corresponding to $R_2=4,800$ dpi of the light source device 1 according to the first embodiment.

Specifically, FIG. 6A shows the main scanning direction position dependence of the reflectivity of each of the deflecting surface 10a of the deflecting unit 10 and the folding mirrors 11 and 12, and the main scanning direction position dependence of the transmissivity of each of the first and second fθ lenses 20a and 20b and the dust-proof glass 21.

In FIG. 6A, the horizontal axis represents a main scanning direction arrival position of a scanning light flux on the scanned surface 30, that is, an image height.

Figure 6B:
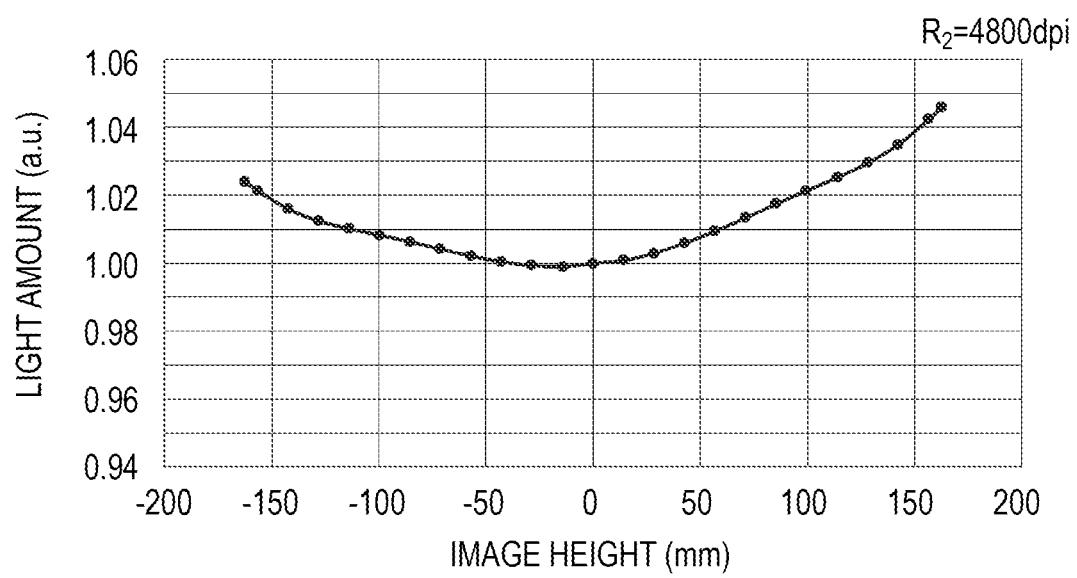
FIG. 6B is a graph for showing an image height dependence of a light amount in the second arrangement of the light scanning apparatus including the light source device according to the first embodiment.

Further, FIG. 6B shows a light amount distribution on the scanned surface 30 generated by the light scanning apparatus 100 in the second arrangement corresponding to $R_2=4,800$ dpi of the light source device 1 according to the first embodiment.

In FIG. 6B, the horizontal axis represents a position in the main scanning direction on the scanned surface 30, that is, an image height, and a light amount at an axial image height is normalized as 1.00.

As shown in FIG. 6B, it is understood that the light amount on the scanned surface 30 is increased from the axial image height toward the most off-axial image height.

Thus, in the light source device 1 according to the first embodiment, in order to obtain a substantially uniform light amount distribution in the main scanning direction on the scanned surface 30, the light emitting amount of the light flux emitted from each light emitting point is changed depending on the position in the main scanning direction of the scanned surface 30.

That is, the light amount unevenness in the main scanning direction of about 5% from peak to peak as shown in FIG. 6B is electrically corrected to reduce the light amount unevenness on the scanned surface 30.

Figure 7:
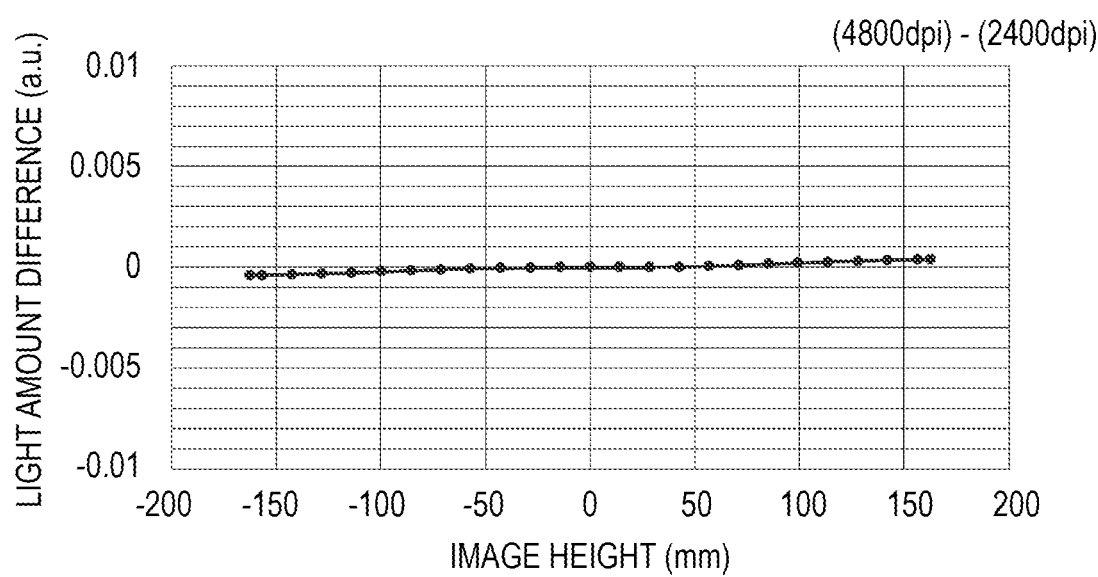
FIG. 7 is a graph for showing a difference in light amount distribution between the first and second arrangements of the light scanning apparatus including the light source device according to the first embodiment.

Further, FIG. 7 shows a difference between the light amount distribution on the scanned surface 30 in the second arrangement shown in FIG. 6B and the light amount distribution on the scanned surface 30 in the first arrangement shown in FIG. 5B.

In the light source device 1 according to the first embodiment, as described above, the polarization angles $\delta_1$ and $\delta_2$ of the linear polarization directions of the light fluxes emitted from the light emitting points in the first and second arrangements are set to 41.6° and −41.6°, respectively.

Thus, as shown in FIG. 7, the light amount difference between the first and second arrangements can be reduced.

Figure 8A:
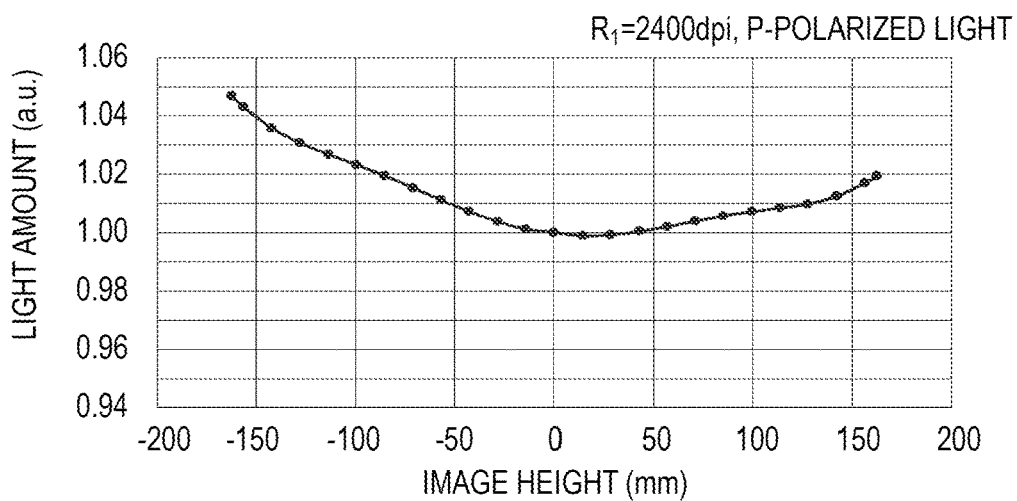
FIG. 8A is a graph for showing a light amount distribution in a first arrangement of a light scanning apparatus including a light source device according to a comparative example.
Figure 8B:
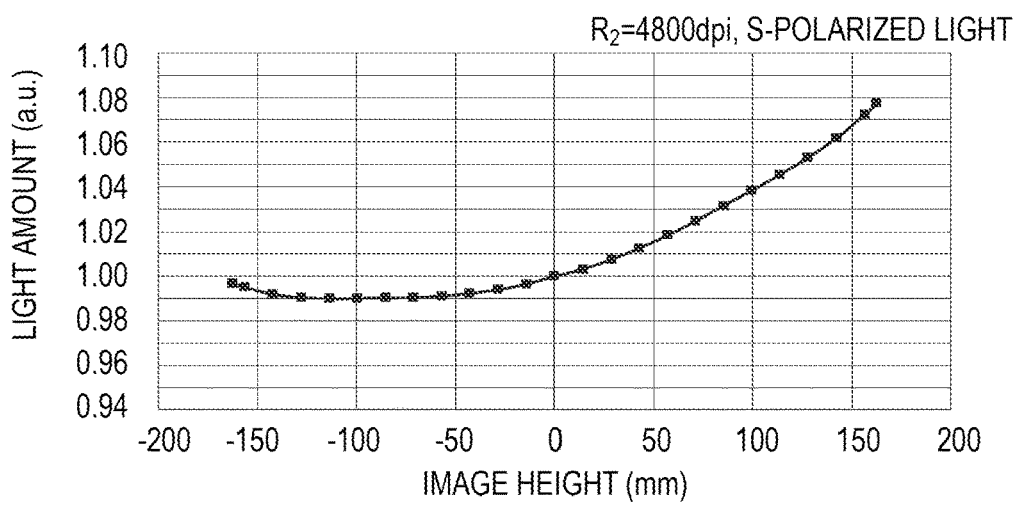
FIG. 8B is a graph for showing a light amount distribution in a second arrangement of the light scanning apparatus including the light source device according to the comparative example.

FIG. 8A and FIG. 8B show light amount distributions on the scanned surface 30 generated by the light scanning apparatus in the first arrangement ($R_1=2,400$ dpi) and P-polarized light of a comparative example, and in the second arrangement ($R_2=4,800$ dpi) and S-polarized light of the comparative example, respectively.

Figure 8C:
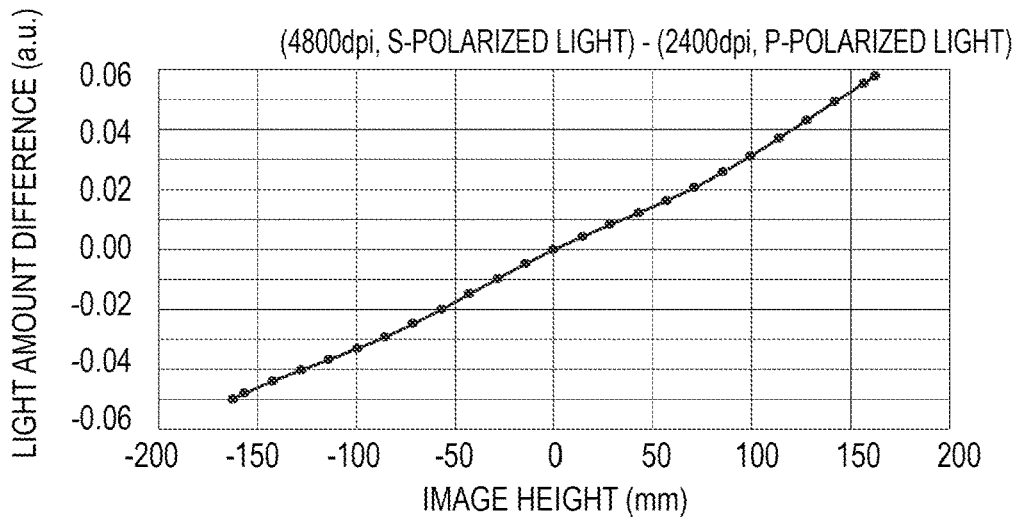
FIG. 8C is a graph for showing a difference in light amount distribution between the first and second arrangements of the light scanning apparatus including the light source device according to the comparative example.

Further, FIG. 8C shows a difference between the light amount distribution on the scanned surface 30 in the second arrangement and S-polarized light shown in FIG. 8B and the light amount distribution on the scanned surface 30 in the first arrangement and P-polarized light shown in FIG. 8A.

In this case, FIG. 8A shows a comparative example of a case in which the polarization angle of the polarization direction of the light flux emitted from each light emitting point when the same light source device as the light source device 1 according to the first embodiment is provided in the first arrangement is 0° with respect to the main scanning cross section, that is, the light flux is caused to be incident on the deflecting surface 10a of the deflecting unit 10 as P-polarized light.

Further, FIG. 8B shows a comparative example of a case in which the polarization angle of the polarization direction of the light flux emitted from each light emitting point when the same light source device as the light source device 1 according to the first embodiment is provided in the second arrangement is 90° with respect to the main scanning cross section, that is, the light flux is caused to be incident on the deflecting surface 10a of the deflecting unit 10 as S-polarized light.

In FIG. 8A and FIG. 8B, the horizontal axis represents a position in the main scanning direction on the scanned surface 30, that is, an image height, and a light amount at an axial image height is normalized as 1.00.

In this comparative example, as shown particularly in FIG. 8B, it is understood that light amount unevenness of about 8% is required to be electrically corrected at the most off-axial image height of the scanned surface 30.

Further, as shown in FIG. 8C, there is caused a change of 10% or more from peak to peak in the difference between the light amount distribution in the second arrangement corresponding to $R_2=4,800$ dpi and the light amount distribution in the first arrangement corresponding to $R_1=2,400$ dpi.

Thus, in this comparative example, it is required to change an electrical light amount correction value. That is, a dynamic range of the laser light amount is required, and a light amount correction value is required to be varied between the second arrangement corresponding to $R_2=4,800$ dpi and the first arrangement corresponding to $R_1=2,400$ dpi.

As a result, an expensive laser or correction circuit is required to be used, which leads to a problem of increase in cost.

Next, the reason why two or more folding mirrors are provided in the light scanning apparatus 100 including the light source device 1 according to the first embodiment is described.

Figure 9A:
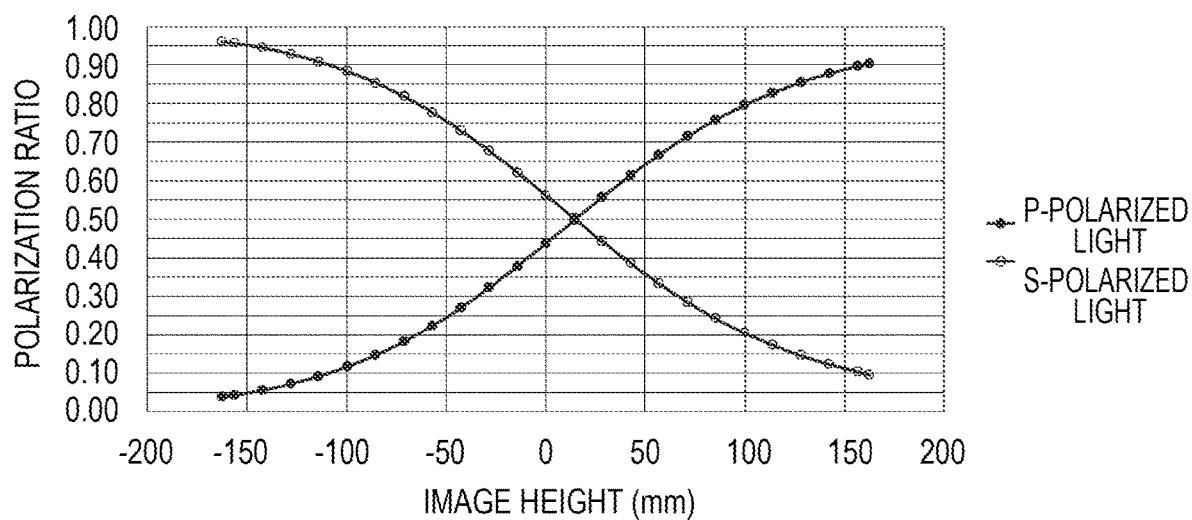
FIG. 9A is a graph for showing a polarization ratio on a folding mirror in the first arrangement of the light scanning apparatus including the light source device according to the first embodiment.
Figure 9B:
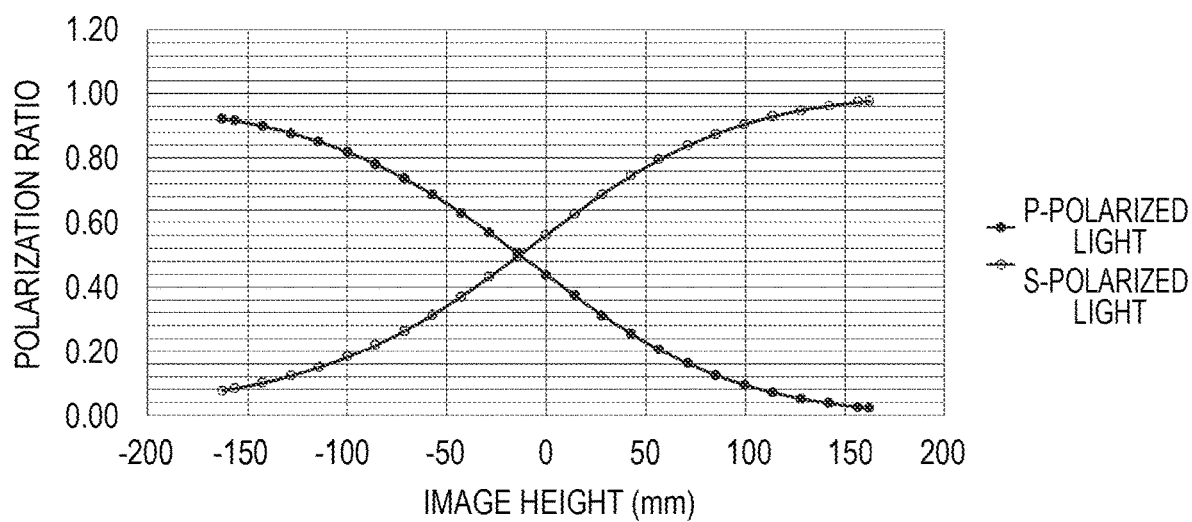
FIG. 9B is a graph for showing a polarization ratio on another folding mirror in the first arrangement of the light scanning apparatus including the light source device according to the first embodiment.

FIG. 9A and FIG. 9B show polarization ratios of the scanning light fluxes entering the folding mirrors 11 and 12, respectively, of the light scanning apparatus 100 in which the light source device 1 according to the first embodiment is provided in the first arrangement corresponding to $R_1=2,400$ dpi.

In this case, the linear polarization direction 200 of the light flux emitted from each light emitting point as described above is tilted by the polarization angle $\delta_1=41.6°$ with respect to the main scanning cross section 202.

Thus, as shown in FIG. 9A, in the vicinity of a position on the optical axis of the folding mirror 11, the scanning light flux contains polarized light components, that is, a P-polarized light component and an S-polarized light component each with a percentage of 50%.

Further, from the position on the optical axis toward the outer side of the optical axis, the scanning light flux contains almost only the P-polarized light component or the S-polarized light component.

Similarly, as shown in FIG. 9B, also in the folding mirror 12, in the vicinity of a position on the optical axis, the scanning light flux contains the P-polarized light component and the S-polarized light component each with a percentage of 50%.

Further, from the position on the optical axis toward the outer side of the optical axis, the scanning light flux contains almost only the P-polarized light component or the S-polarized light component.

In this case, in the light scanning apparatus 100 including the light source device 1 according to the first embodiment, the folding by the folding mirrors 11 and 12 is designed so that the percentages of the P-polarized light component and the S-polarized light component of the off-axial light flux are inverted across the vicinity of the position on the optical axis between the folding mirrors 11 and 12.

Specifically, each of the folding mirrors 11 and 12 has a sum of the incident angle and the reflection angle being set to an acute angle, and has substantially the same value of the sum.

Further, the folding mirrors 11 and 12 are designed so as to have the same film configuration, that is, have the same polarization reflectivity characteristic.

In this manner, the light amount unevenness in the light amount distribution on the scanned surface 30 to be caused by the scanning light fluxes reflected by the folding mirrors 11 and 12 can be canceled.

Thus, in the light scanning apparatus 100 including the light source device 1 according to the first embodiment, a folding mirror having a large difference in reflectivity between the P-polarized light and the S-polarized light can be used.

Figure 10A:
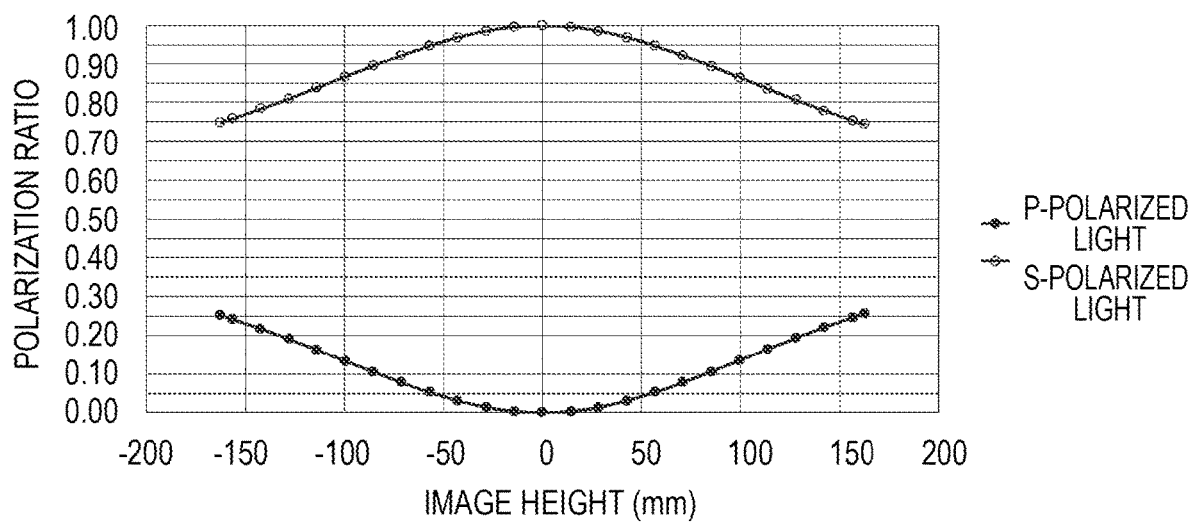
FIG. 10A is a graph for showing a polarization ratio on a folding mirror in the first arrangement of the light scanning apparatus including the light source device according to the comparative example.
Figure 10B:
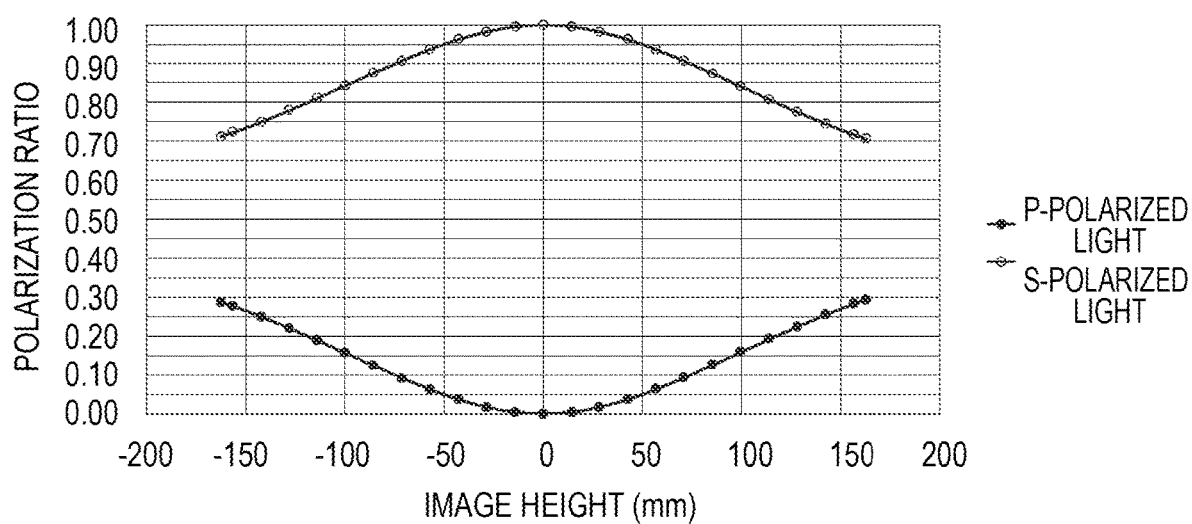
FIG. 10B is a graph for showing a polarization ratio on another folding mirror in the first arrangement of the light scanning apparatus including the light source device according to the comparative example.

FIG. 10A and FIG. 10B show polarization ratios of the scanning light fluxes entering the folding mirrors 11 and 12, respectively, of the light scanning apparatus in the first arrangement of the comparative example.

In this comparative example, the polarization angle of the polarization direction of the light flux emitted from each light emitting point when the same light source device as the light source device 1 according to the first embodiment is provided in the first arrangement is 0° with respect to the main scanning cross section, that is, the light flux is caused to enter the deflecting surface 10a of the deflecting unit 10 as P-polarized light.

Thus, as shown in FIG. 10A and FIG. 10B, in each of the folding mirrors 11 and 12, a percentage of the S-polarized light component is 100% in the vicinity of a position on the optical axis.

Further, from the position on the optical axis toward the outer side of the optical axis, the S-polarized light component is decreased, while the P-polarized light component is increased.

That is, in this comparative example, the scanning light flux contains only the S-polarized light component in the vicinity of the position on the optical axis of each of the folding mirrors 11 and 12.

Meanwhile, on the outer side of the optical axis, the percentages of the S-polarized light component and the P-polarized light component in the folding mirror 11 are substantially equal to the percentages of the S-polarized light component and the P-polarized light component in the folding mirror 12.

It is thus understood that, in this comparative example, the above-mentioned canceling effect of the light scanning apparatus 100 including the light source device 1 according to the first embodiment cannot be used.

As described above, in the light scanning apparatus 100 including the light source device 1 according to the first embodiment, the polarization angle of the light flux emitted from the light source device 1 is set close to 45 degrees, and at least two folding mirrors having the same angle dependence of the reflectivity are appropriately arranged.

In this manner, the difference in light amount distribution on the scanned surface 30 can be reduced between the second arrangement corresponding to $R_2$=4,800 dpi and the first arrangement corresponding to $R_1$=2,400 dpi.

As described above, in the light source device 1 according to the first embodiment, when the plurality of two-dimensionally arrayed light emitting points are projected within a plurality of cross sections different from each other, the light emitting points can have substantially uniform intervals.

In this manner, a plurality of light scanning apparatus having resolutions different from each other can be designed only by rotating the light source device 1 according to the first embodiment without changing the optical system.

Thus, the light source device 1 according to the first embodiment has an advantage in that an investment to an apparatus for assembling the light scanning apparatus can be suppressed, and that the resolution can be increased through use of inexpensive components.

Further, the array direction, the array pitch, and the polarization angle of the light emitting points are appropriately set in the light source device 1 according to the first embodiment. In this manner, the light amount unevenness on the scanned surface can be reduced when the light source device 1 is mounted on the light scanning apparatus, and the definition can be increased.

Second Embodiment

Figure 11A:
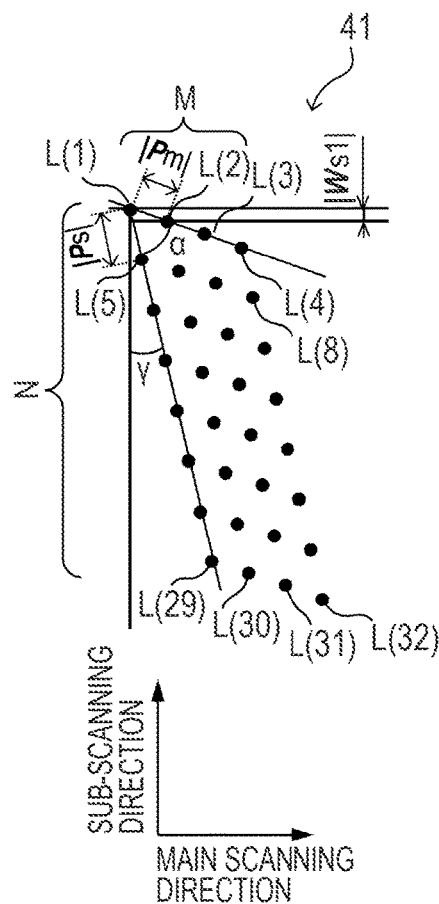
FIG. 11A is a view for illustrating a light emitting point array in a first arrangement of a light source device according to a second embodiment.
Figure 11B:
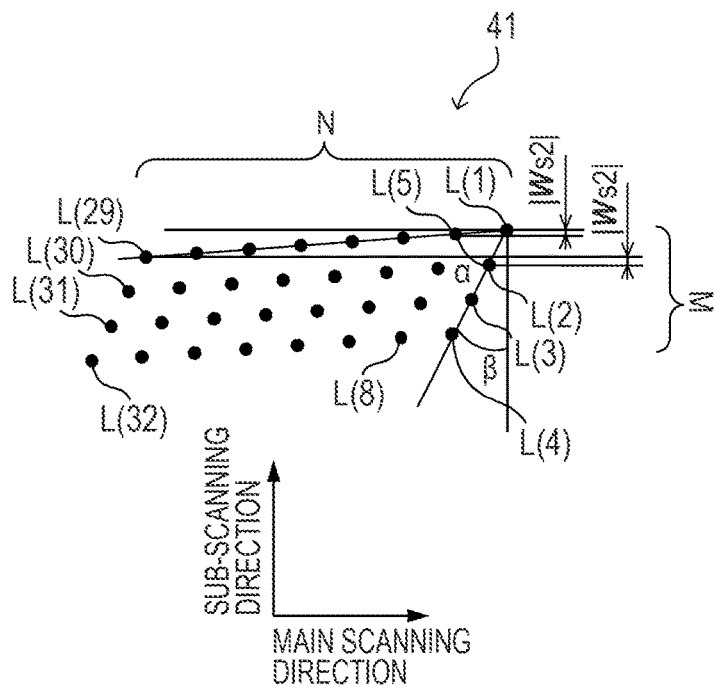
FIG. 11B is a view for illustrating a light emitting point array in a second arrangement of the light source device according to the second embodiment.

FIG. 11A and FIG. 11B are illustrations of light emitting point arrays in a first arrangement and a second arrangement, respectively, of a light source device 41 according to a second embodiment.

Figure 11C:
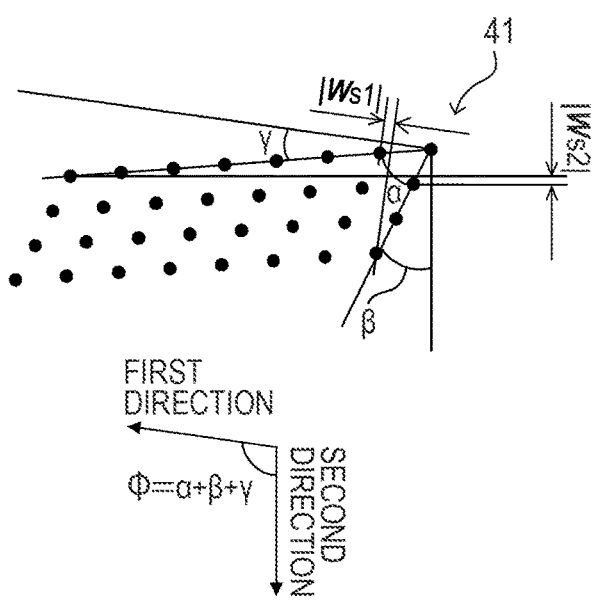
FIG. 11C is a view for illustrating a relationship among angles in the light source device according to the second embodiment.

Further, FIG. 11C is an illustration of a relationship among the angles "α," "β," "γ," and "φ" in the light source device 41 according to the second embodiment.

In this case, the first arrangement refers to an arrangement to be used for the light scanning apparatus 100 having the resolution $R_1$ in the sub-scanning direction on the scanned surface 30 of $R_1$=2,400 dpi.

Further, the second arrangement refers to an arrangement to be used for the light scanning apparatus 100 having the resolution $R_2$ in the sub-scanning direction on the scanned surface 30 of $R_2$=4,800 dpi. The second arrangement is an arrangement rotated clockwise by φ=(α+β+γ) from the first arrangement within the first cross section parallel to the main scanning direction and the sub-scanning direction.

Similarly to the light source device 1 according to the first embodiment, the light source device 41 according to the second embodiment is formed of a surface emitting laser (VCSEL) in which thirty-two light emitting points are two-dimensionally arrayed (arranged in matrix) within the first cross section.

Further, as illustrated in FIG. 11A, in the first arrangement, the thirty-two light emitting points are arrayed in a parallelogram shape having four columns and eight rows (M=4×N=8).

That is, in the light source device 41 according to the second embodiment, when adjacent two sides of the parallelogram are defined as a row and a column, the thirty-two light emitting points are arranged in matrix.

Further, in the first arrangement, the number of light emitting points in a column (N=8) is larger than the number of light emitting points in a row (M=4).

In this case, an angle (acute angle) formed between a column direction defined by eight light emitting points and a row direction defined by four light emitting points is represented by "α."

Further, in the first arrangement, an angle (acute angle) formed between the column direction defined by the eight light emitting points and the sub-scanning direction (first direction) is represented by "γ."

Further, for the convenience of description, the column direction defined by the eight light emitting points and the row direction defined by the four light emitting points in the first arrangement are referred to as a row direction defined by eight light emitting points and a column direction defined by four light emitting points in the second arrangement.

That is, as illustrated in FIG. 11B, in the second arrangement, the thirty-two light emitting points are arrayed in a parallelogram shape having eight columns and four rows (N=8×M=4).

In this case, in the second arrangement, an angle (acute angle) formed between the column direction defined by the four light emitting points and the sub-scanning direction (second direction) is represented by "β."

In this case, as illustrated in FIG. 11A and FIG. 11B, the thirty-two light emitting points are labeled from L(1) to L(32).

As described above, in the light source device 41 according to the second embodiment, as compared to the light source device 1 according to the first embodiment, the matrix arrangement of the light emitting points is widened (for example, in the first arrangement, widened in the main scanning direction).

In this manner, an interval shift which may occur in accordance with a mounting error of the light source device 41 when the light source device 41 is mounted on the light scanning apparatus 100 can be easily adjusted.

Further, in the light source device 41 according to the second embodiment, an interval $|vP_s|$ between light emitting points adjacent to each other among the eight light emitting points in the column direction in the first arrangement (that is, for example, an interval between L(1) and L(5) in the column direction) is set to 0.040 mm. In this case, $vP_s$ represents a vector from a predetermined light emitting point to the adjacent subsequent light emitting point in the column direction.

Further, an interval $|vP_m|$ between light emitting points adjacent to each other among the four light emitting points in the row direction in the first arrangement (that is, for example, an interval between L(1) and L(2) in the row direction) is set to 0.043 mm. In this case, $vP_m$ represents a vector from a predetermined light emitting point to the adjacent subsequent light emitting point in the row direction.

In the light source device 41 according to the second embodiment, in order to facilitate arranging of wiring patterns in laser chip manufacture and to improve heat radiation performance, the interval $|vP_s|$ and the interval $|vP_m|$ are set to 0.040 mm and 0.043 mm, respectively.

It should be noted that, in the following, for example, $|vP_s|$ and $|vP_m|$ are sometimes expressed simply as $P_s$ and $P_m$, respectively.

Next, a method of determining the values of the angles "α," "β," and "γ" in the light source device 41 according to the second embodiment is described.

First, an absolute value of a sub-scanning lateral magnification of the entire optical system of the light scanning apparatus 100 on which the light source device 41 according to the second embodiment is mounted in the first arrangement is represented by $|β_{s1}|$.

At this time, in order to achieve the resolution of $R_1=2$,400 dpi, when the thirty-two light emitting points in the first arrangement are projected within the sub-scanning cross section, an interval $|vW_{s1}|$ between light emitting points adjacent to each other is obtained from the following expression (9):

$$|vW_{s1}|=25.4/(R_1\times|\beta_{s1}|) \qquad (9),$$

as $|vW_{s1}|=0.0106/|\beta_{s1}|$. In this case, $vW_{s1}$ represents a vector from a predetermined light emitting point to the adjacent subsequent light emitting point obtained when the thirty-two light emitting points in the first arrangement are projected within the sub-scanning cross section.

Similarly, an absolute value of a sub-scanning lateral magnification of the entire optical system of the light scanning apparatus 100 on which the light source device 41 according to the second embodiment is mounted in the second arrangement is represented by $|\beta_{s2}|$.

At this time, in order to achieve the resolution of $R_2=4$,800 dpi, when the thirty-two light emitting points in the second arrangement are projected within the sub-scanning cross section, an interval $|vW_{s2}|$ between light emitting points adjacent to each other is obtained from the following expression (10):

$$|vW_{s2}|=25.4/(R_2\times|\beta_{s2}|) \qquad (10),$$

as $|vW_{s2}|=0.0053/|\beta_{s2}|$. In this case, $vW_{s2}$ represents a vector from a predetermined light emitting point to the adjacent subsequent light emitting point obtained when the thirty-two light emitting points in the second arrangement are projected within the sub-scanning cross section.

Next, with reference to FIG. 11A and FIG. 11B, the following expressions (11) and (12) can be obtained through use of the formula of an orthographic projection vector.

$$\frac{vW_{s1}\cdot vP_s}{|vW_{s1}|^2}vW_{s1} = M\frac{vW_{s1}\cdot vP_m}{|vW_{s1}|^2}vW_{s1} \qquad (11)$$

$$\frac{vW_{s2}\cdot vP_m}{|vW_{s2}|^2}vW_{s2} = N\frac{vW_{s2}\cdot vP_s}{|vW_{s1}|^2}vW_{s2} \qquad (12)$$

That is, the expression (11) gives a condition for satisfying that, when the thirty-two light emitting points in the first arrangement are projected within the sub-scanning cross section (second cross section) parallel to the sub-scanning direction (first direction) and a direction (third direction) perpendicular to the first cross section, the light emitting points have equal intervals between light emitting points adjacent to each other.

Similarly, the expression (12) gives a condition for satisfying that, when the thirty-two light emitting points in the second arrangement are projected within the sub-scanning cross section (third cross section) parallel to the sub-scanning direction (second direction) and the direction (third direction) perpendicular to the first cross section, the light emitting points have equal intervals between light emitting points adjacent to each other.

Thus, the following expressions (13) and (14) can be obtained from the expressions (11) and (12).

$$vW_{s1}\cdot vP_s = M\times vW_{s1}\cdot vP_m \qquad (13)$$

$$vW_{s2}\cdot vP_m = N\times vW_{s2}\cdot vP_s \qquad (14)$$

Then, through use of the angles illustrated in FIG. 11A and FIG. 11B, the following expressions (15), (16), (17), and (18) can be obtained from the formula of an inner product of vectors.

$$vW_{s1}\cdot vP_s=|vW_{s1}|\times|vP_s|\times\cos\gamma \qquad (15)$$

$$vW_{s2}\cdot vP_m=|vW_{s2}|\times|vP_m|\times\cos\beta \qquad (16)$$

$$vW_{s1}\cdot vP_m=|vW_{s1}|\times|vP_m|\times\cos(\alpha+\gamma) \qquad (17)$$

$$vW_{s2}\cdot vP_s=|vW_{s2}|\times|vP_s|\times\cos(\alpha+\beta) \qquad (18)$$

In this case, when the expressions (15) and (17) are substituted into the expression (13), the following expression (19) can be obtained.

$$|vP_s|\times\cos\gamma=M\times|vP_m|\times\cos(\alpha+\gamma) \qquad (19)$$

Similarly, when the expressions (16) and (18) are substituted into the expression (14), the following expression (20) can be obtained.

$$|vP_m|\times\cos\beta=N\times|vP_s|\times\cos(\alpha+\beta) \qquad (20)$$

Further, with reference to FIG. 11A and FIG. 11B, the following expressions (21) and (22) can be obtained through use of the relationship of trigonometric ratios.

$$\cos\gamma=M\times|vW_{s1}|/|vP_s| \qquad (21)$$

$$\cos\beta=N\times|vW_{s2}|/|vP_m| \qquad (22)$$

In this case, when the expression (9) is substituted into the expression (21), the following expression (23) can be obtained.

$$|vP_s|=(M\times25.4)/(R_1\times|=_{s1}|\times\cos\gamma) \qquad (23)$$

Similarly, when the expression (10) is substituted into the expression (22), the following expression (24) can be obtained.

$$|vP_m|=(N\times25.4)/(R_2\times|=_{s2}|\times\cos\beta) \qquad (23)$$

Then, when the expression (23) is substituted into the left side of the expression (19), the following expression (25) can be obtained.

$$\cos(\alpha+\gamma)=25.4/(|vP_m|\times R_1\times|\beta_{s1}|) \qquad (25)$$

Similarly, when the expression (24) is substituted into the left side of the expression (20), the following expression (26) can be obtained.

$$\cos(\alpha+\beta)=25.4/(|vP_s|\times R_2\times|\beta_{s2}|) \qquad (26)$$

In this case, there are two approaches for determining the values of the angles "$\alpha$," "$\beta$," and "$\gamma$."

One approach is the first approach corresponding to a case in which the priority is given to the design of the light source device 41, and then the optical system of the light scanning apparatus 100 on which the light source device 41 is mounted is designed in accordance with the light source device 41.

Another approach is the second approach corresponding to a case in which the priority is given to the design of the optical system of the light scanning apparatus 100 on which the light source device 41 is mounted, and then the light source device 41 is designed in accordance with the optical system of the light scanning apparatus 100.

In the light source device 41 according to the second embodiment, the former first approach is used to determine the values of the angles "$\alpha$," "$\beta$," and "$\gamma$."

That is, first, the matrix arrangement of the thirty-two light emitting points in the design of the light source device 41, that is, the value of the angle "$\alpha$" formed between the column direction and the row direction is determined.

In this case, the value of the angle "$\alpha$" is determined so as not to be excessively small. That is, when the angle "$\alpha$" is excessively small, an interval between light emitting points in a diagonal direction (for example, an interval between L(2) and L(5)) becomes excessively smaller than an interval between light emitting points adjacent to each other in the row direction or the column direction (for example, an interval between L(1) and L(5)).

In this case, in the design of the light source device 41, it is difficult to arrange the wiring patterns, and the heat radiation performance is reduced.

Meanwhile, when the angle "α" is excessively increased, the matrix arrangement of the thirty-two light emitting points in the first arrangement is increased in the main scanning direction, which may lead to increase in size of the light source device 41.

In consideration of the above, in the light source device 41 according to the second embodiment, the angle "α" is set as α=56.6°.

At this time, in terms of the design of the optical system of the light scanning apparatus 100, it is preferred to provide large absolute values $|\beta_{s1}|$ and $|\beta_{s2}|$ of the sub-scanning lateral magnification of the entire optical system of the light scanning apparatus 100 on which the light source device 41 is mounted, that is, to provide a magnifying optical system.

Thus, it is preferred to decrease $|vW_{s1}|$ and $|vW_{s2}|$, that is, increase the values of the angles "β" and "γ."

Meanwhile, when the value of the angle "γ" is excessively increased, the matrix arrangement of the thirty-two light emitting points in the first arrangement is increased in the main scanning direction, which may lead to increase in size of the light source device 41.

In consideration of the above, the absolute values $|\beta_{s1}|$ and $|\beta_{s2}|$ of the sub-scanning lateral magnification of the entire optical system of the light scanning apparatus 100 on which the light source device 41 according to the second embodiment is mounted are each set to 1.06.

Then, when α=56.6°, $|\beta_{s1}|$=1.06, $|vP_m|$=0.043 mm, and $R_1$=2,400 dpi are substituted into the expression (25), the angle "γ" can be obtained as γ=19.15°. P Similarly, when α=56.6°, $|\beta_{s2}|$=1.06, $|vP_s|$=0.040 mm, and $R_2$=4,800 dpi are substituted into the expression (26), the angle "β" can be obtained as β=25.80°.

Further, from the expressions (9) and (10), $|vW_{s1}|$=0.010 mm and $|vW_{s2}|$=0.005 mm are obtained.

Thus, $|vW_{s2}|/|vW_{s1}|$=0.50 is obtained, and hence the light source device 41 according to the second embodiment satisfies the following conditional expression (27).

$$0.4 < |vW_{s2}|/|vW_{s1}| < 0.6 \tag{27}$$

In this case, the expression (9) can be rewritten as the following expression (28) through use of the expression (25).

$$|vW_{s1}| = 25.4/(R_1 \times |\beta_{s1}|) = |vP_m| \times \cos(\alpha+\gamma) \tag{28}$$

Similarly, the expression (10) can be rewritten as the following expression (29) through use of the expression (26).

$$|vW_{s2}| = 25.4/(vR_2 \times |\beta_{s2}|) = |vP_s| \times \cos(\alpha+\beta) \tag{29}$$

Thus, the expression (27) can be rewritten as the following expression (30) through use of the expressions (28) and (29).

$$0.4 < (|vP_s|\cos(\alpha+\beta))/(|vP_m|\omega s(\alpha+\gamma)) < 0.6 \tag{30}$$

In this case, from $|vP_s|$=0.040 mm, $|vP_m|$=0.043 mm, α=56.6°, β=25.80°, and γ=19.15°, the ratio in the conditional expression (30) is 0.50. Thus, it is understood that the light source device 41 according to the second embodiment satisfies the conditional expression (30).

As described above, when the conditional expression (30) is satisfied, two light scanning apparatus having resolutions different from each other by two times can be designed only by rotating the light source device 41 according to the second embodiment without changing the optical system.

The light source device 41 according to the second embodiment is preferred to satisfy the following conditional expression (27a).

$$0.42 < |vW_{s2}|/|vW_{s1}| < 0.58 \tag{27a}$$

In other words, the light source device 41 according to the second embodiment is preferred to satisfy the following conditional expression (30a).

$$0.42 < (|vP_s|\times\cos(\alpha+\beta))/(|vP_m|\times\cos(\alpha+\gamma)) < 0.58 \tag{30a}$$

Further, the light source device 41 according to the second embodiment is more preferred to satisfy the following conditional expression (27b).

$$0.45 < |vW_{s2}|/|vW_{s1}| < 0.55 \tag{27b}$$

In other words, the light source device 41 according to the second embodiment is more preferred to satisfy the following conditional expression (30b).

$$0.45 < (|vP_s|\times\cos(\alpha+\beta))/(|vP_m|\times\cos(\alpha+\gamma)) < 0.55 \tag{30b}$$

In the case of γ=0° in the light source device 41 according to the second embodiment, the light source device 41 corresponds to the configuration of the light source device 1 according to the first embodiment.

When the priority is given to the design of the optical system of the light scanning apparatus 100 on which the light source device 41 is mounted, the absolute values $|\beta_{s1}|$ and $|\beta_{s2}|$ of the sub-scanning lateral magnification of the entire optical system of the light scanning apparatus 100 are first determined, and hence $|vW_{s1}|$ and $|vW_{s2}|$ are determined from the expressions (9) and (10).

Next, the angles "β" and "γ" are determined from the expressions (21) and (22) through use of $|vP_m|$ and $|vP_s|$ set in the light source device 41, and finally the angle "α" is determined from the expression (28) or (29).

With reference to FIG. 3 and FIG. 11C, 90°−θ=α+β+γ is satisfied, and hence when 90°−θ=α+β+γ and γ=0° are substituted into the expression (20), the expression (2) can be obtained.

As described above, the light source device 1 according to the first embodiment can be considered as being formed based on the second approach corresponding to the case in which the priority is given to the design of the optical system of the light scanning apparatus 100 on which the light source device 41 is mounted, and then the light source device 41 is designed in accordance with the optical system of the light scanning apparatus 100.

Further, as described above, in the light source device 41 according to the second embodiment, in order to change the light source device 41 from the first arrangement to the second arrangement, the light source device 41 is required to be rotated clockwise by φ=(α+β+γ).

That is, the light source device 41 according to the second embodiment is rotated clockwise by φ=(56.6°+25.80°+19.15°)=101.55°.

Further, in the light source device 41 according to the second embodiment, the angle for changing the light source device 41 from the first arrangement to the second arrangement, that is, the angle "gyp" formed between the sub-scanning direction (first direction) in the first arrangement and the sub-scanning direction (second direction) in the second arrangement is preferred to satisfy the following conditional expression (31).

$$70.0° < \varphi < 110.0° \tag{31}$$

In the light source device 41 according to the second embodiment, when the conditional expression (31) is satisfied, as described below, the difference in light amount distribution on the scanned surface 30 can be reduced between the first arrangement and the second arrangement.

Further, in the light source device 41 according to the second embodiment, the angle "φ" formed between the sub-scanning direction (first direction) in the first arrangement and the sub-scanning direction (second direction) in the second arrangement is more preferred to satisfy the following conditional expression (31a).

$$72.0° < \varphi < 108.0° \quad (31a)$$

Further, in the light source device 41 according to the second embodiment, the angle "φ" formed between the sub-scanning direction (first direction) in the first arrangement and the sub-scanning direction (second direction) in the second arrangement is still more preferred to satisfy the following conditional expression (31b).

$$75.0° < \varphi < 105.0° \quad (31b)$$

As described above, in the light source device 41 according to the second embodiment, the resolution can be increased from $R_1=2,400$ dpi to $R_2=4,800$ dpi only by rotating the light source device 41 from the first arrangement to the second arrangement without changing the optical system of the light scanning apparatus 100 on which the light source device 41 is mounted.

Thus, the light source device 41 according to the second embodiment has an advantage in that an investment to an apparatus for assembling the light scanning apparatus can be suppressed, and that the resolution can be increased through use of inexpensive components.

Further, the polarization angle $\delta_1$ formed with respect to the main scanning cross section by the linear polarization direction of the light flux emitted from each of the light emitting points in the first arrangement corresponding to $R_1=2,400$ dpi of the light source device 41 according to the second embodiment is set to $\varphi/2=(\alpha+\beta+\gamma)/2=50.78°$. In this manner, as described later, the difference in light amount in a longitudinal direction on the scanned surface 30 can be reduced.

Further, as described above, when the light source device 41 according to the second embodiment is changed from the first arrangement to the second arrangement, the light source device 41 is rotated clockwise by $(\alpha+\beta+\gamma=101.55°)$ from the first arrangement within the first cross section parallel to the main scanning direction and the sub-scanning direction.

Thus, the polarization angle $\delta_2$ formed with respect to the main scanning cross section by the linear polarization direction of the light flux emitted from each of the light emitting points in the second arrangement corresponding to $R_2=4,800$ dpi of the light source device 41 according to the second embodiment is set to $-\varphi/2=-(\alpha+\beta+\gamma)/2=-50.78°$.

Figure 12A:
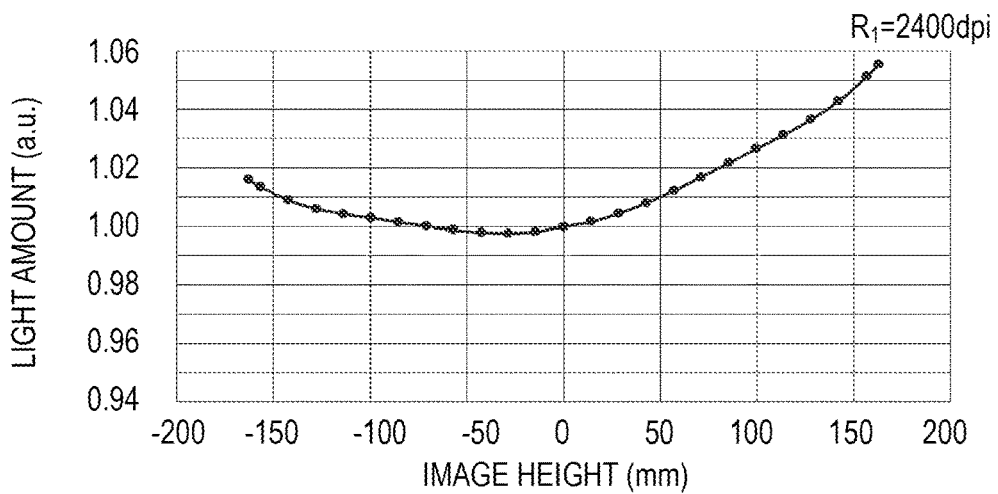
FIG. 12A is a graph for showing a light amount distribution in the first arrangement of a light scanning apparatus including the light source device according to the second embodiment.

FIG. 12A shows a light amount distribution on the scanned surface 30 generated by the light scanning apparatus 100 in the first arrangement corresponding to $R_1=2,400$ dpi of the light source device 41 according to the second embodiment.

In FIG. 12A, the horizontal axis represents a position in the main scanning direction on the scanned surface 30, that is, an image height, and a light amount at an axial image height is normalized as 1.00.

As shown in FIG. 12A, it is understood that the light amount on the scanned surface 30 is increased from the axial image height toward the most off-axial image height.

Thus, in the light source device 41 according to the second embodiment, in order to obtain a substantially uniform light amount distribution in the main scanning direction on the scanned surface 30, the light emitting amount of the light flux emitted from each light emitting point is changed depending on the position in the main scanning direction of the scanned surface 30.

That is, the light amount unevenness in the main scanning direction of about 6% from peak to peak as shown in FIG. 12A is electrically corrected to reduce the light amount unevenness on the scanned surface 30.

Figure 12B:
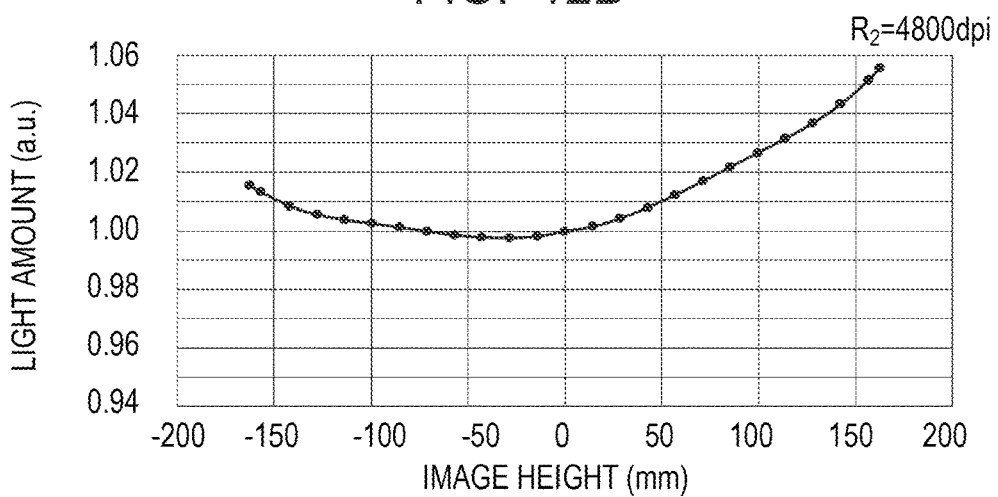
FIG. 12B is a graph for showing a light amount distribution in the second arrangement of the light scanning apparatus including the light source device according to the second embodiment.

Further, FIG. 12B shows a light amount distribution on the scanned surface 30 generated by the light scanning apparatus 100 in the second arrangement corresponding to $R_2=4,800$ dpi of the light source device 41 according to the second embodiment.

In FIG. 12B, the horizontal axis represents a position in the main scanning direction on the scanned surface 30, that is, an image height, and a light amount at an axial image height is normalized as 1.00.

As shown in FIG. 12B, it is understood that the light amount on the scanned surface 30 is increased from the axial image height toward the most off-axial image height.

Thus, in the light source device 41 according to the second embodiment, in order to obtain a substantially uniform light amount distribution in the main scanning direction on the scanned surface 30, the light emitting amount of the light flux emitted from each light emitting point is changed depending on the position in the main scanning direction of the scanned surface 30.

That is, the light amount unevenness in the main scanning direction of about 6% from peak to peak as shown in FIG. 12B is electrically corrected to reduce the light amount unevenness on the scanned surface 30.

Figure 12C:
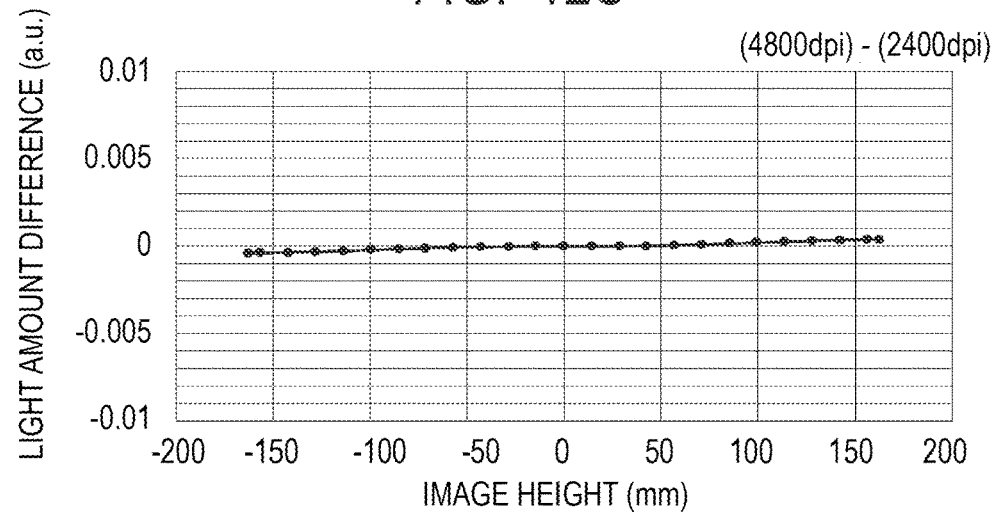
FIG. 12C is a graph for showing a difference in light amount distribution between the first and second arrangements of the light scanning apparatus including the light source device according to the second embodiment.

Further, FIG. 12C shows a difference between the light amount distribution on the scanned surface 30 in the second arrangement shown in FIG. 12B and the light amount distribution on the scanned surface 30 in the first arrangement shown in FIG. 12A.

As described above, in the light source device 41 according to the second embodiment, the polarization angles $\delta_1$ and $\delta_2$ formed with respect to the main scanning cross section by the linear polarization directions of the light fluxes emitted from the light emitting points in the first and second arrangements are set to 50.78° and −50.78°, respectively.

Thus, as shown in FIG. 12C, the light amount difference between the first and second arrangements can be reduced.

Thus, the rotation of the light source device 41 according to the second embodiment can be adjusted at a small rotation angle, and when the two-dimensionally arrayed light emitting points are projected within a plurality of cross sections different from each other, the light emitting points can have substantially uniform intervals.

In this manner, a plurality of light scanning apparatus having resolutions different from each other can be designed only by rotating the light source device 41 according to the second embodiment without changing the optical system.

Further, the array direction, the array pitch, and the polarization angle of the light emitting points are appropriately set in the light source device 41 according to the second embodiment. In this manner, the light amount unevenness on the scanned surface can be reduced when the light source device 41 is mounted on the light scanning apparatus, and the definition can be increased.

Third Embodiment

Next, a light scanning apparatus including a light source device according to a third embodiment is described.

The light scanning apparatus including the light source device according to the third embodiment has the same configuration as the light scanning apparatus 100 including the light source device 41 according to the second embodiment, and hence the same members are denoted by the same reference symbols to omit the description thereof.

In the light source device according to the third embodiment, as illustrated in FIG. 11A and FIG. 11B, when the thirty-two light emitting points in the first arrangement are projected within the sub-scanning cross section (second cross section) parallel to the sub-scanning direction (first direction) and the direction (third direction) perpendicular to the first cross section, the light emitting points have equal intervals between light emitting points adjacent to each other.

Further, in the light source device according to the third embodiment, when the thirty-two light emitting points in the second arrangement are projected within the sub-scanning cross section (third cross section) parallel to the sub-scanning direction (second direction) and the direction (third direction) perpendicular to the first cross section, the light emitting points have equal intervals between light emitting points adjacent to each other.

That is, the light source device according to the third embodiment satisfies the expressions (11) and (12).

Further, the light source device according to the third embodiment is configured to emit a light flux of linearly polarized light having a polarization angle $\delta_1=(\alpha+\beta+\gamma)/2$ with respect to the main scanning cross section in the first arrangement, and to emit a light flux of linearly polarized light having a polarization angle $\delta_2=-(\alpha+\beta+\gamma)/2$ with respect to the main scanning cross section in the second arrangement.

Further, the light scanning apparatus 100 including the light source device according to the third embodiment includes the reflecting optical system 80 configured to reflect the light flux deflected by the deflecting unit 10 to the scanned surface 30. The reflecting optical system 80 includes at least two reflecting members having the same angle dependence of the reflectivity.

In this manner, only by rotating the light source device from the first arrangement to the second arrangement, the resolution can be increased, and the difference in light amount on the scanned surface 30 can be reduced between the first arrangement and the second arrangement, without changing the optical system of the light scanning apparatus 100 on which the light source device is mounted.

It is also possible to design the light scanning apparatus so that the light source device according to any one of the first to third embodiments is switchable between the first arrangement and the second arrangement.

According to the present invention, it is possible to provide a light source device for a light scanning apparatus, which is capable of forming an image at high speed so as to correspond to a plurality of resolutions without changing an optical system.

(Monochrome Image Forming Apparatus)

Figure 13:
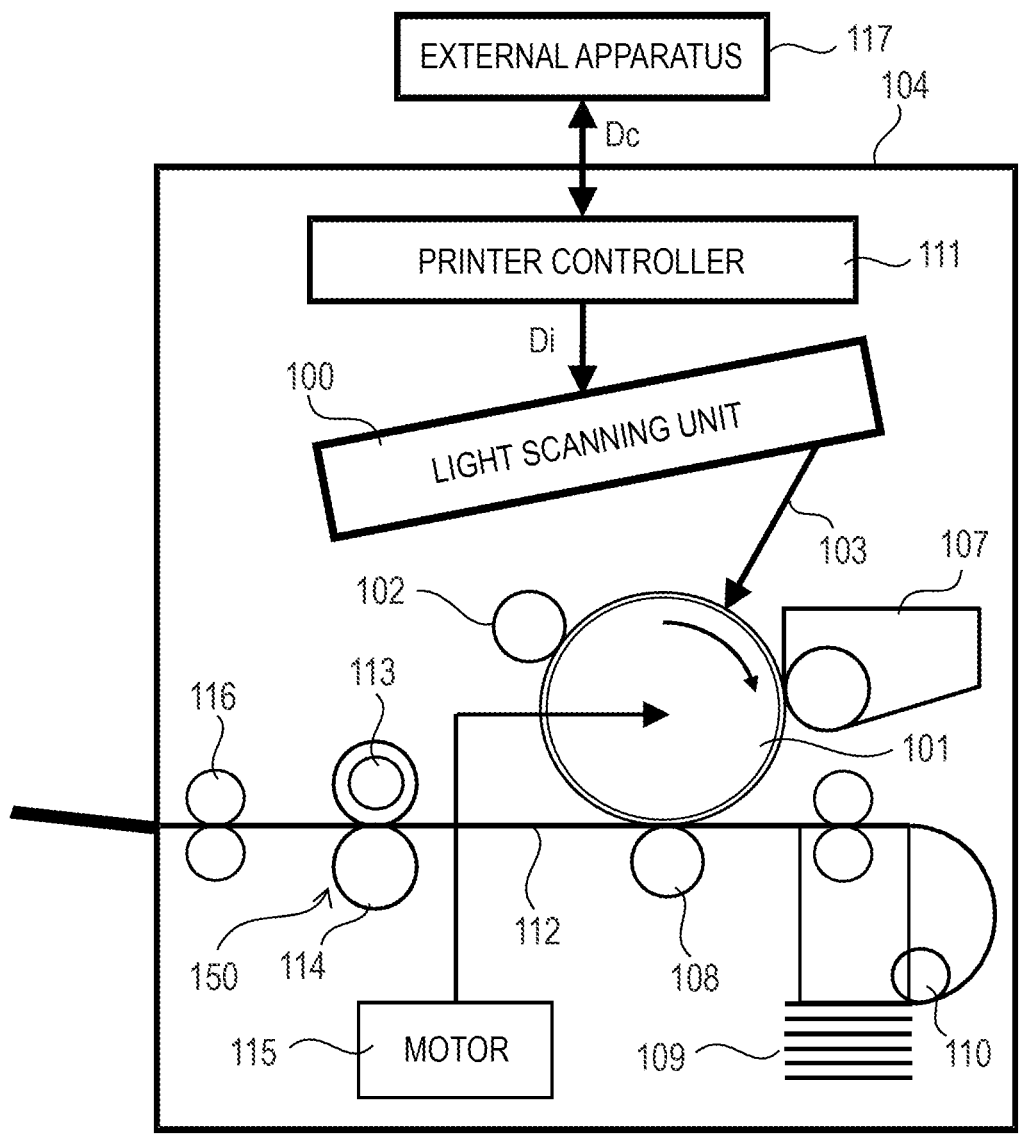
FIG. 13 is a main-part sub-scanning cross-sectional view of a monochrome image forming apparatus according to another embodiment.

FIG. 13 is a main-part sub-scanning cross-sectional view of a monochrome image forming apparatus 104 having mounted thereon a light scanning unit 100 including the light source device according to any one of the first to third embodiments.

To the monochrome image forming apparatus 104, code data Dc output from an external apparatus 117, for example, a personal computer, is input. This code data Dc is converted into image data (dot data) Di by a printer controller 111 in the image forming apparatus 104. This image data Di is input to the light scanning unit 100. Then, a light beam 103 modulated in accordance with the image data Di is emitted from the light scanning unit 100, and this light beam 103 scans on a photosensitive surface of a photosensitive drum 101 in the main scanning direction.

The photosensitive drum 101 serving as an electrostatic latent image bearing member (photosensitive member) is rotated clockwise by a motor 115. Then, along with this rotation, the photosensitive surface of the photosensitive drum 101 is moved with respect to the light beam 103 in the sub-scanning direction orthogonal to the main scanning direction. On the upper side of the photosensitive drum 101, a charging roller 102 configured to uniformly charge the surface of the photosensitive drum 101 is provided in abutment against the surface of the photosensitive drum 101. Further, the light beam 103 scanned by the light scanning unit 100 is radiated to the surface of the photosensitive drum 101 charged by the charging roller 102.

As described above, the light beam 103 is modulated based on the image data Di, and this light beam 103 is radiated to form an electrostatic latent image on the surface of the photosensitive drum 101. This electrostatic latent image is developed as a toner image by a developing device 107 arranged so as to abut against the photosensitive drum 101 on the downstream side in the rotating direction of the photosensitive drum 101 with respect to the position at which the light beam 103 is radiated.

The toner image developed by the developing device 107 is transferred onto a sheet 112 serving as a transferred material by a transferring roller (transferring device) 108 arranged on the lower side of the photosensitive drum 101 so as to oppose the photosensitive drum 101. The sheet 112 is stored in a sheet cassette 109 arranged on the front side (right side of FIG. 13) of the photosensitive drum 101, but a sheet can also be fed manually. A sheet feeding roller 110 is arranged at the end portion of the sheet cassette 109 to send the sheet 112 in the sheet cassette 109 to a conveyance path.

As described above, the sheet 112 having transferred thereon an unfixed toner image is further conveyed to a fixing device 150 arranged on the rear side (left side of FIG. 13) of the photosensitive drum 101. The fixing device 150 includes a fixing roller 113 and a pressurizing roller 114. The fixing roller 113 includes a fixing heater (not shown) therein. The pressurizing roller 114 is arranged in pressure-contact with the fixing roller 113. The sheet 112 conveyed from the transferring portion is pressurized and heated at a pressure-contact portion between the fixing roller 113 and the pressurizing roller 114 so that the unfixed toner image on the sheet 112 is fixed. Further, sheet discharging rollers 116 are arranged on the rear side of the fixing device 150, and the sheet 112 subjected to the fixing is discharged to the outside of the monochrome image forming apparatus 104.

The printer controller 111 is configured to perform not only data conversion but also control of units in the monochrome image forming apparatus 104 such as the motor 115, and a polygon motor in the light scanning unit 100.

(Color Image Forming Apparatus)

Figure 14:
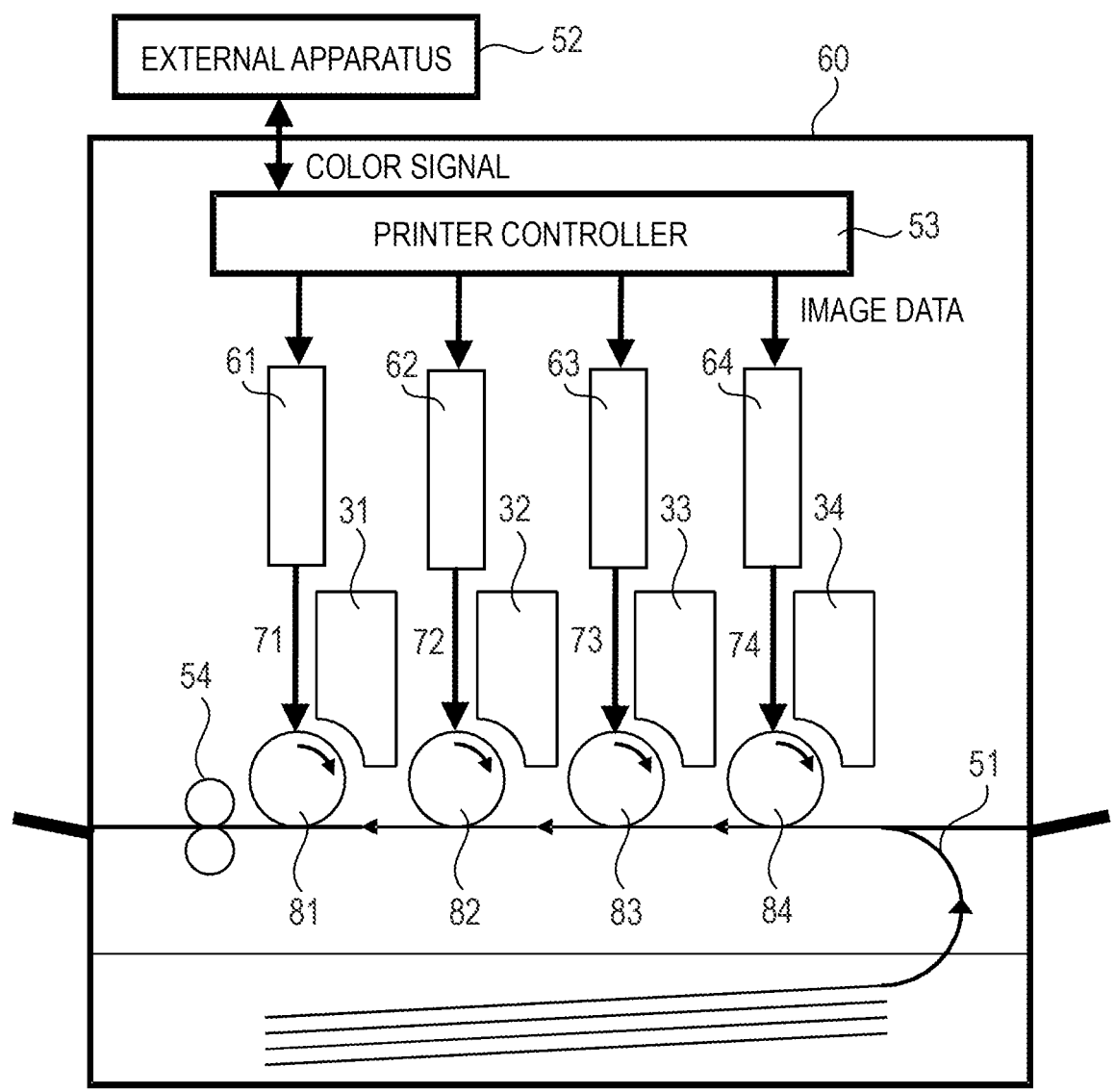
FIG. 14 is a main-part sub-scanning cross-sectional view of a color image forming apparatus according to another embodiment.

FIG. 14 is a main-part sub-scanning cross-sectional view of an image forming apparatus 60 having mounted thereon light scanning apparatus 61 to 64 each including the light source device according to any one of the first to third embodiments.

The image forming apparatus 60 is a tandem-type color image forming apparatus in which four light scanning apparatus are arranged in parallel to each other, and each of the light scanning apparatus is configured to record image information on a surface of a photosensitive drum serving as an image bearing member.

The image forming apparatus 60 includes the light scanning apparatus 61, 62, 63, and 64, and photosensitive drums 81, 82, 83, and 84. The light scanning apparatus 61, 62, 63, and 64 each include the light source device according to any one of the first to third embodiments. The photosensitive drums 81, 82, 83, and 84 each serve as the image bearing member.

Further, the image forming apparatus 60 includes developing devices 31, 32, 33, and 34, a conveyance belt 51, a printer controller 53, and a fixing device 54.

To the image forming apparatus 60, color signals (code data) of red (R), green (G), and blue (B) are input from an external apparatus 52, for example, a personal computer. Those color signals are converted into image patterns of cyan (C), magenta (M), yellow (Y), and black (K) by the printer controller 53 in the apparatus. Those image patterns are input as image signals and image information to the light scanning apparatus 61, 62, 63, and 64. Then, those light scanning apparatus 61, 62, 63, and 64 emit light fluxes 71, 72, 73, and 74 modulated in accordance with the image patterns of the four colors, respectively. Those light beams scan on the photosensitive surfaces of the photosensitive drums 81, 82, 83, and 84, respectively, in the main scanning direction.

In the image forming apparatus 60, for example, the cyan (C) image signal is input to the light scanning apparatus 61, the magenta (M) image signal is input to the light scanning apparatus 62, the yellow (Y) image signal is input to the light scanning apparatus 63, and the black (K) image signal is input to the light scanning apparatus 64. Then, the image signals are recorded in parallel on the photosensitive surfaces of the photosensitive drums 81, 82, 83, and 84 so that color images are printed at high speed.

In the image forming apparatus 60, as described above, the four light scanning apparatus 61, 62, 63, and 64 form electrostatic latent images of the four colors on the photosensitive surfaces of the corresponding photosensitive drums 81, 82, 83, and 84 through use of the light fluxes that are based on the image data.

After that, the electrostatic latent images of the four colors are developed as toner images of the four colors by the developing devices 31, 32, 33, and 34, and the developed toner images of the four colors are subjected to multi-layer transfer onto a transferred material conveyed by the conveyance belt 51, by a transferring device. Then, the transferred toner images are fixed by the fixing device 54 so that one full-color image is formed.

For example, in order to form only the black (K) image at high resolution, the arrangements of the light source devices in the light scanning apparatus 61 to 63 may be different from the arrangement of the light source device in the light scanning apparatus 64.

Further, as the external apparatus 52, for example, a color image reading apparatus including a CCD sensor may be used. In this case, this color image reading apparatus and the color image forming apparatus 60 form a color digital copying machine.

Further, the image forming apparatus 60 is not limited to a configuration including four light scanning apparatus and four photosensitive drums. For example, only one light scanning apparatus and only one photosensitive drum may be provided. Further, two, three, or five or more light scanning apparatus and two, three, or five or more photosensitive drums may be provided.

The exemplary embodiments of the present invention are described above, but the present invention is not limited to those embodiments and can be modified and changed variously within the scope of the gist thereof.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019 208877, filed Nov. 19, 2019, which is hereby incorporated by reference herein in its entirety.

What is claimed is:

1. A light source device comprising:
   a plurality of light emitting points arranged in matrix within a first cross section parallel to a first direction and a second direction,
   wherein, when the plurality of light emitting points are projected within a second cross section parallel to the first direction and a third direction perpendicular to the first cross section, the plurality of light emitting points have equal intervals between projections adjacent to each other,
   wherein, when the plurality of light emitting points are projected within a third cross section parallel to the second direction and the third direction, the plurality of light emitting points have equal intervals between projections adjacent to each other, and
   wherein the following condition is satisfied:

$$0.4 < (P_s \times \cos(\alpha+\beta))/(P_m \times \cos(\alpha+\gamma)) < 0.6,$$

where $P_m$ represents an interval between light emitting points adjacent to each other in a row of the matrix, $P_s$ represents an interval between light emitting points adjacent to each other in a column of the matrix, $\alpha$ represents an angle formed between the row and the column, $\gamma$ represents an angle formed between the column and the first direction, and $\beta$ represents an angle formed between the row and the second direction.

2. The light source device according to claim 1, wherein the number of light emitting points in the row and the number of light emitting points in the column are different from each other.

3. The light source device according to claim 1, wherein the plurality of light emitting points correspond to a VCSEL.

4. A light scanning apparatus comprising:
   the light source device of claim 1;
   a deflecting unit configured to deflect a light flux from the light source device to scan a scanned surface in a main scanning direction; and
   an imaging optical system configured to guide the light flux deflected by the deflecting unit to the scanned surface.

5. The light scanning apparatus according to claim 4, wherein the first direction is parallel to a sub-scanning direction.

6. The light scanning apparatus according to claim 4, wherein the second direction is parallel to a sub-scanning direction.

7. The light scanning apparatus according to claim 4, wherein the light source device is switchable between a first arrangement in which the first direction is parallel to a sub-scanning direction and a second arrangement in which the second direction is parallel to the sub-scanning direction.

8. The light scanning apparatus according to claim 4, further comprising a reflecting optical system configured to reflect the light flux deflected by the deflecting unit, the reflecting optical system including two reflecting members having the same angle dependence of a reflectivity, wherein the light source device is configured to emit linearly polarized light having a polarization direction with an angle of $(\alpha+\beta+\gamma)/2$ with respect to a main scanning cross section.

9. The light scanning apparatus according to claim 7, wherein the following condition is satisfied:

$$70.0° < \varphi < 110.0°,$$

where $\varphi$ represents a rotation angle within the first cross section when the light source device is changed from the first arrangement to the second arrangement.

10. An image forming apparatus comprising:
the light scanning apparatus of claim 4;
a developing device configured to develop, as a toner image, an electrostatic latent image formed on the scanned surface by the light scanning apparatus;
a transferring device configured to transfer the developed toner image onto a transferred material; and
a fixing device configured to fix the transferred toner image on the transferred material.

11. An image forming apparatus comprising:
the light scanning apparatus of claim 4; and
a printer controller configured to convert a signal output from an external apparatus into image data to input the image data to the light scanning apparatus.

12. A light scanning apparatus comprising:
a light source device including a plurality of light emitting points arranged in matrix within a first cross section;
a deflecting unit configured to deflect a light flux from the light source device to scan a scanned surface in a main scanning direction;
an imaging optical system configured to guide the light flux deflected by the deflecting unit to the scanned surface; and
a reflecting optical system configured to reflect the light flux deflected by the deflecting unit, the reflecting optical system including two reflecting members having the same angle dependence of a reflectivity,
wherein, in each of a case in which the light source device is provided in a first arrangement and a case in which the light source device is provided in a second arrangement, when the plurality of light emitting points are projected on a sub-scanning cross section, the plurality of light emitting points have equal intervals between projections adjacent to each other, and
wherein the light source device is configured to emit linearly polarized light having a polarization direction with an angle of $(\alpha+\beta+\gamma)/2$ with respect to a main scanning cross section, where $\alpha$ represents an angle formed between a row and a column of the matrix, $\gamma$ represents an angle formed between the column and a sub-scanning direction when the light source device is provided in the first arrangement, and $\beta$ represents an angle formed between the column and the sub-scanning direction when the light source device is provided in the second arrangement.

13. The light scanning apparatus according to claim 12, wherein the following condition is satisfied:

$$0.4 < (P_s \times \cos(\alpha+\beta))/(P_m \times \cos(\alpha+\gamma)) < 0.6,$$

where $P_m$ represents an interval between light emitting points adjacent to each other in the row, and $P_s$ represents an interval between light emitting points adjacent to each other in the column.

14. The light scanning apparatus according to claim 12, wherein the number of light emitting points in the row and the number of light emitting points in the column are different from each other.

15. An image forming apparatus comprising:
the light scanning apparatus of claim 12;
a developing device configured to develop, as a toner image, an electrostatic latent image formed on the scanned surface by the light scanning apparatus;
a transferring device configured to transfer the developed toner image onto a transferred material; and
a fixing device configured to fix the transferred toner image on the transferred material.

16. An image forming apparatus comprising:
the light scanning apparatus of claim 12; and
a printer controller configured to convert a signal output from an external apparatus into image data to input the image data to the light scanning apparatus.

* * * * *